United States Patent
Strand et al.

(10) Patent No.: US 12,105,239 B2
(45) Date of Patent: Oct. 1, 2024

(54) SURVEYING WITH NON-UNIFORM SURVEY CONFIGURATION WITH WIDE-TOW SOURCE GEOMETRY

(71) Applicant: PGS Geophysical AS, Oslo (NO)

(72) Inventors: Christian Strand, Finchampstead (GB); Martin Widmaier, Oslo (NO); Carine Roalkvam, Oslo (NO)

(73) Assignee: PGS Geophysical AS, Oslo (NO)

( * ) Notice: Subject to any disclaimer, the term of this patent is extended or adjusted under 35 U.S.C. 154(b) by 0 days.

(21) Appl. No.: 17/463,784

(22) Filed: Sep. 1, 2021

(65) Prior Publication Data

US 2022/0099856 A1 Mar. 31, 2022

Related U.S. Application Data

(60) Provisional application No. 63/083,333, filed on Sep. 25, 2020.

(51) Int. Cl.
  *G01V 1/38* (2006.01)
  *G01V 1/30* (2006.01)
(52) U.S. Cl.
  CPC .............. *G01V 1/3808* (2013.01); *G01V 1/30* (2013.01); *G01V 1/38* (2013.01); *G01V 1/3843* (2013.01);
  (Continued)
(58) Field of Classification Search
  CPC .......... G01V 1/3808; G01V 1/30; G01V 1/38; G01V 1/3843
  See application file for complete search history.

(56) References Cited

U.S. PATENT DOCUMENTS

| 3,249,177 A | 5/1966 | Chelminski |
| 4,481,611 A | 11/1984 | Burrage |

(Continued)

FOREIGN PATENT DOCUMENTS

| CN | 1 058 101 A | 1/1992 |
| EP | 0 525 391 A1 | 6/1992 |

(Continued)

OTHER PUBLICATIONS

"3-D binning," SEG wiki, https://wiki.seg.org/wiki/3-D_binning, date unknown, 3 pages.

(Continued)

*Primary Examiner* — Daniel L Murphy
*Assistant Examiner* — Amie M Ndure

(57) ABSTRACT

A method and apparatus for marine surveying includes: towing sources in a wide-tow source geometry; towing streamers that comprise receivers; actuating at least one of the sources to create a signal; and detecting the signal with a first receiver, wherein: at least one of the source separations or the streamer separations is non-uniform, and the sources and the receivers provide a regular sampling grid for the survey area. A system includes a survey plan; sources in a wide-tow source geometry; and streamers comprising receivers, wherein: at least one of the source separations or the streamer separations is non-uniform, and the sail lines, sources, and receivers provide uniform CMP coverage for the survey area. A method includes operating a system in a survey area, the system having a non-uniform configuration with wide-tow source geometry; actuating at least one source to create a signal; and detecting the signal with a first receiver.

19 Claims, 24 Drawing Sheets

(52) U.S. Cl.
CPC ............... *G01V 2210/1293* (2013.01); *G01V 2210/1423* (2013.01)

(56) References Cited

U.S. PATENT DOCUMENTS

| | | | |
|---|---|---|---|
| 4,727,956 A | 3/1988 | Huizer | |
| 4,974,212 A | 11/1990 | Shieman | |
| 5,281,773 A | 1/1994 | Duren | |
| 5,402,391 A | 3/1995 | Cordsen | |
| 5,430,689 A | 7/1995 | Rigsby et al. | |
| 5,443,027 A | 8/1995 | Owsley et al. | |
| 5,771,202 A | 6/1998 | Bale et al. | |
| 5,924,049 A | 7/1999 | Beasley et al. | |
| 5,973,995 A | 10/1999 | Walker et al. | |
| 6,011,752 A | 1/2000 | Ambs et al. | |
| 6,021,379 A | 2/2000 | Duren et al. | |
| 6,028,822 A | 2/2000 | Lansley et al. | |
| 6,144,342 A | 11/2000 | Bertheas et al. | |
| 6,665,618 B1 | 12/2003 | Thomas et al. | |
| 6,882,938 B2 | 4/2005 | Vaage et al. | |
| 7,092,315 B2 | 8/2006 | Olivier | |
| 7,376,045 B2 | 5/2008 | Falkenberg et al. | |
| 7,400,552 B2 | 7/2008 | Moldoveanu et al. | |
| 7,423,929 B1 | 9/2008 | Olivier | |
| 7,696,818 B2 | 4/2010 | Kunihiro | |
| 7,916,576 B2 | 3/2011 | Beasley et al. | |
| 7,969,818 B2 | 6/2011 | Burren | |
| 8,488,409 B2 | 7/2013 | Hill et al. | |
| 8,730,760 B2 | 5/2014 | Cambois et al. | |
| 8,818,730 B2 | 8/2014 | Fick et al. | |
| 8,837,255 B2 | 9/2014 | Ross et al. | |
| 8,897,094 B2 | 11/2014 | Fick et al. | |
| 8,971,152 B2 | 3/2015 | Chelminski | |
| 9,010,484 B2 | 4/2015 | Coste et al. | |
| 9,188,692 B2 | 11/2015 | Haumonte | |
| 9,746,570 B2 | 8/2017 | Mensch | |
| 9,835,745 B2 | 12/2017 | Desrues | |
| 10,139,511 B2 | 11/2018 | Mensch | |
| 10,324,203 B2 | 6/2019 | Long | |
| 10,379,256 B2 | 8/2019 | Adams et al. | |
| 10,627,534 B2 | 4/2020 | Bernitsas et al. | |
| 11,493,651 B2* | 11/2022 | Long | G01V 1/00 |
| 2004/0013037 A1 | 1/2004 | Vaage | |
| 2005/0027454 A1 | 2/2005 | Vaage et al. | |
| 2006/0050611 A1 | 3/2006 | Borresen | |
| 2006/0227658 A1 | 10/2006 | Toennessen et al. | |
| 2006/0239117 A1 | 10/2006 | Singh et al. | |
| 2007/0223307 A1 | 9/2007 | Storteig et al. | |
| 2007/0294036 A1 | 12/2007 | Strack et al. | |
| 2008/0008033 A1 | 1/2008 | Fossum et al. | |
| 2008/0011540 A1 | 1/2008 | Moldoveanu et al. | |
| 2008/0144436 A1 | 6/2008 | Pickering et al. | |
| 2009/0141587 A1 | 6/2009 | Welker et al. | |
| 2009/0274004 A1 | 11/2009 | Ferber et al. | |
| 2009/0296520 A1 | 12/2009 | Keers et al. | |
| 2010/0002536 A1 | 1/2010 | Brewer et al. | |
| 2010/0027374 A1 | 2/2010 | Moldoveanu et al. | |
| 2010/0118645 A1 | 5/2010 | Welker | |
| 2011/0158044 A1* | 6/2011 | Moldoveanu | G01V 1/3808 367/20 |
| 2011/0199857 A1 | 8/2011 | Garden et al. | |
| 2011/0242935 A1 | 10/2011 | Amundsen et al. | |
| 2011/0305106 A1 | 12/2011 | Eick et al. | |
| 2011/0305113 A1 | 12/2011 | Eick et al. | |
| 2012/0048642 A1 | 3/2012 | Hopperstad et al. | |
| 2012/0257474 A1 | 10/2012 | Cambois et al. | |
| 2013/0250720 A1 | 9/2013 | Monk et al. | |
| 2013/0322205 A1 | 12/2013 | Widmaier et al. | |
| 2014/0078862 A1 | 3/2014 | Guevel et al. | |
| 2014/0121977 A1 | 5/2014 | Lecocq | |
| 2014/0269173 A1 | 9/2014 | Coste et al. | |
| 2014/0269176 A1 | 9/2014 | Mattsson | |
| 2014/0286128 A1 | 9/2014 | Grimm et al. | |
| 2014/0376331 A1 | 12/2014 | Howieson et al. | |
| 2015/0234071 A1 | 8/2015 | Hegna | |
| 2016/0003959 A1 | 1/2016 | Bowman et al. | |
| 2017/0017005 A1 | 1/2017 | Siliqi | |
| 2017/0059727 A1 | 3/2017 | Eick et al. | |
| 2017/0115419 A1 | 4/2017 | Van Groenestijn | |
| 2017/0176636 A1* | 6/2017 | Adams | G01V 1/3808 |
| 2017/0199292 A1 | 7/2017 | Tonnessen et al. | |
| 2017/0235003 A1 | 8/2017 | Elboth et al. | |
| 2017/0363760 A1* | 12/2017 | Mensch | G01V 1/3808 |
| 2018/0001977 A1* | 1/2018 | Toennessen | B63B 35/68 |
| 2018/0164450 A1 | 6/2018 | Long | |
| 2018/0164455 A1 | 6/2018 | Elboth et al. | |
| 2018/0164457 A1 | 6/2018 | Beitz et al. | |
| 2018/0321406 A1 | 11/2018 | Strand et al. | |
| 2018/0335536 A1* | 11/2018 | Li | G01V 1/368 |
| 2018/0372900 A1 | 12/2018 | Lelaurin et al. | |
| 2019/0113645 A1 | 4/2019 | Hegna et al. | |
| 2019/0120988 A1 | 4/2019 | O'Dowd | |
| 2019/0219717 A1 | 7/2019 | Godoy et al. | |
| 2019/0277987 A1 | 9/2019 | Long | |
| 2020/0012004 A1 | 1/2020 | Elboth et al. | |
| 2021/0247533 A1 | 8/2021 | O'Dowd | |

FOREIGN PATENT DOCUMENTS

| | | |
|---|---|---|
| EP | 2 508 918 A2 | 10/2012 |
| EP | 2 280 294 B1 | 6/2014 |
| EP | 3118655 A1 | 1/2017 |
| EP | 3 206 052 A1 | 8/2017 |
| GB | 2 429 541 A | 2/2007 |
| GB | 2 517 071 A | 2/2015 |
| GB | 2 545 542 A | 6/2017 |
| GB | 2 559 845 A | 8/2018 |
| GB | 2589011 A | 5/2021 |
| GB | 2592125 A | 8/2021 |
| RU | 7212 U1 | 7/1998 |
| WO | 96/18117 A1 | 6/1996 |
| WO | 02 25315 A2 | 3/2002 |
| WO | 2005111657 A1 | 11/2005 |
| WO | 2009092069 A1 | 7/2009 |
| WO | 2011103081 A2 | 8/2011 |
| WO | 2011 156 491 A1 | 12/2011 |
| WO | 2014 152 125 A1 | 9/2014 |
| WO | 2016 009 270 A1 | 1/2016 |
| WO | 2017102289 A1 | 6/2017 |
| WO | 2018 067 016 A1 | 4/2018 |
| WO | 2018108979 A1 | 6/2018 |
| WO | 2018 208 168 A1 | 11/2018 |
| WO | 2019073050 A1 | 4/2019 |
| WO | 2019246297 A1 | 12/2019 |
| WO | 2020 249 701 A1 | 12/2020 |

OTHER PUBLICATIONS

Brice, Tim, et al.—"Wide-tow source configurations for towed multimeasurement streamer acquisition," 2015 SEG New Orleans Annual Meeting, pp. 86-88.

Chelminski, Steve, et al.—"Low-frequency pneumatic seismic sources," Geophysical Prospecting, received Mar. 2018, revision accepted Feb. 2019, European Association of Geoscientists & Engineers, pp. 1-10.

Dhelie, P.E., et al.—"Towards a seismic point source—Smaller, quieter and cheaper," 2017 SEG International Exposition and 87th Annual Meeting, pp. 85-89.

GWL—"GWL LF Source" brochure, date unknown, 1 page.

Hager, Ed, et al.—"Efficient multi-source and multi-streamer configuration for dense cross-line sampling," presented at 2015 SEG New Orleans Annual Meeting, pp. 100-104.

Hegna, Stian, et al.—"The low frequency output of marine air-gun arrays," 2011 SEG San Antonio Annual Meeting, pp. 77-81.

Johnston, R.C., et al.—"Special Report of the SEG Technical Standards Committee, SEG standards for specifying marine seismic energy sources," document converted from the original publication, 1988 [Special report on marine seismic energy source standards, Geophysics, 53. No. 04, 566-575 (Errata in GEO-53-7-1011)], pp. 1-14.

(56) References Cited

OTHER PUBLICATIONS

Long, Andrew—"Increasing Towed Streamer Survey Efficiency," A Clearer Image, a PGS publication, Aug. 2018, pp. 1-15.
Long, Andrew—"Source and streamer towing strategies for improved efficiency, spatial sampling and near offset coverage," First Break, vol. 35, Nov. 2017, pp. 71-74.
Mosher, Charles C., et al.—"Operational deployment of compressive sensing systems for seismic data acquisition," The Leading Edge, Aug. 2017, pp. 661-669.
PGS—"Dual versus Triple Source," PGS Webpage https://www.pgs.com/marine-acquisition/tools-and-techniques/marine-seismic-sources/technology/dual-versus-triple-source/, Feb. 20, 2020, 5 pages.
PGS—"PGS and TGS Joint Venture MultiClient Project in the Barents Sea," PGS Webpage https://www.pgs.com/media-and-events/news/pgs-and-tgs-joint-venture-multiclient-project-in-the-barents-sea/, May 29, 2018, 3 pages.
PGS—"Ramform + Triple Source = Ultra HD3D," PGS Webpage https://www.pgs.com/publications/feature-stories/ramform-plus-triple-source-equals-ultra-hd3d/, Jun. 1, 2018, 5 pages.
Ronen, Shuki, et al.—Tuned Pulse Source—a new low frequency seismic source, 2017 SEG International Exposition and 87th Annual Meeting, pp. 6085-6088.
Teledyne Bolt—"Long Life Seismic Source" brochure, 2015, 2 pages.
Teledyne Marine—Teledyne Bolt Model 1500LL Source, technical specifications, date unknown, 1 page.
Widmaier, Martin, et al.—"Recent advances with wide-tow multi-sources in marine seismic streamer acquisition and imaging," First Break, vol. 38, Dec. 2020, pp. 74-79.
Widmaier, Martin, et al.—Redefining marine towed-streamer acquisition, First Break, vol. 37, Nov. 2019, pp. 57-62.
Widmaier, Martin, et al.—"Strategies for High Resolution Towed Streamer Acquisition and Imaging of Shallow Targets," 2017 SEG International Exposition and 87th Annual Meeting, pp. 186-190.
United Kingdom Search Report dated Mar. 8, 2022, for Application No. GB2113622.1.
Examination Report in EP18789044.7 dated Jun. 15, 2021.
International Search Report and Written Opinion in PCT/EP2018/077915 dated Feb. 7, 2019.
Eurasian Search Report in EA 201270372 dated Oct. 22, 2012.
Search Report in GB1720777.0 dated Jun. 13, 2018.
Polarcus, "Xarray: Controlled Soundfield Sampling," (Poilarcus, Aug. 2015).
Anonymous, "Sabah MC3D" (PGS, Oct. 2015).
Anonymous, "Principles of Streamer Overlap Shooting," Tech Link, vol. 5, No. 10 (PGS, Oct. 2005).
Anonymous, "TopSeis—The Tailor Made Solution for Subsurface Exploration and Development in the Barents Sea," (CGG, Apr. 2017).
Vinje, et al., "Shooting Over the Seismic Spread," First Break, vol. 35, pp. 97-104 (EAGE, Jun. 2017).
GB Examination Report in GB2101597.9 dated Aug. 18, 2023.
GB Examination Report in GB2101597.9 dated Nov. 21, 2023.
GB Examination Report in GB2400633.0 dated Jan. 1, 2024.
NO Search Report in NO20171999 dated Jan. 19, 2024.
AU Examination Report in AU2018350171 dated Aug. 25, 2023.
GB Examination Report in GB2113622.1 dated Aug. 7, 2023.
GB Examination Report in GB2113622.1 dated Dec. 7, 2023.

* cited by examiner

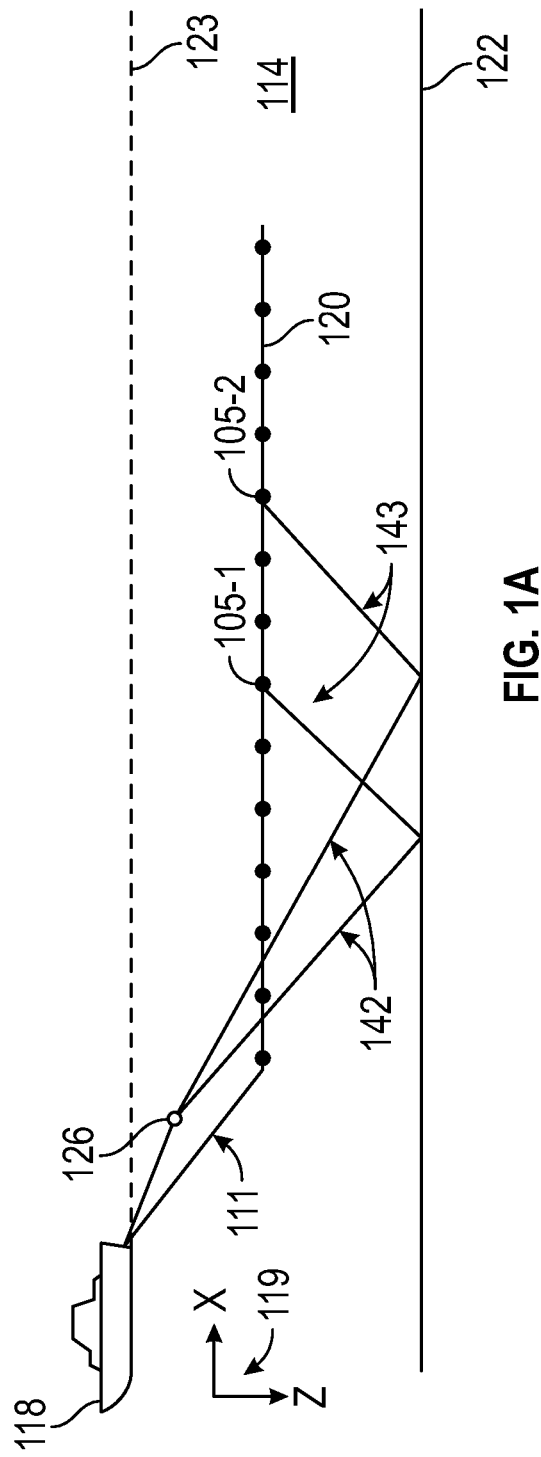
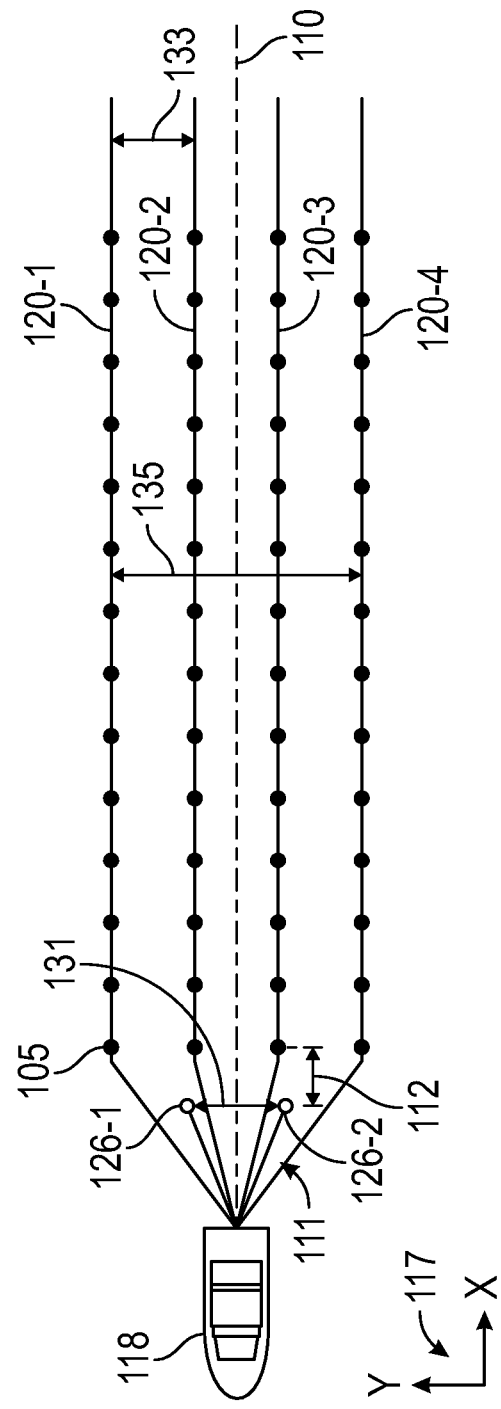
FIG. 1A
FIG. 1B

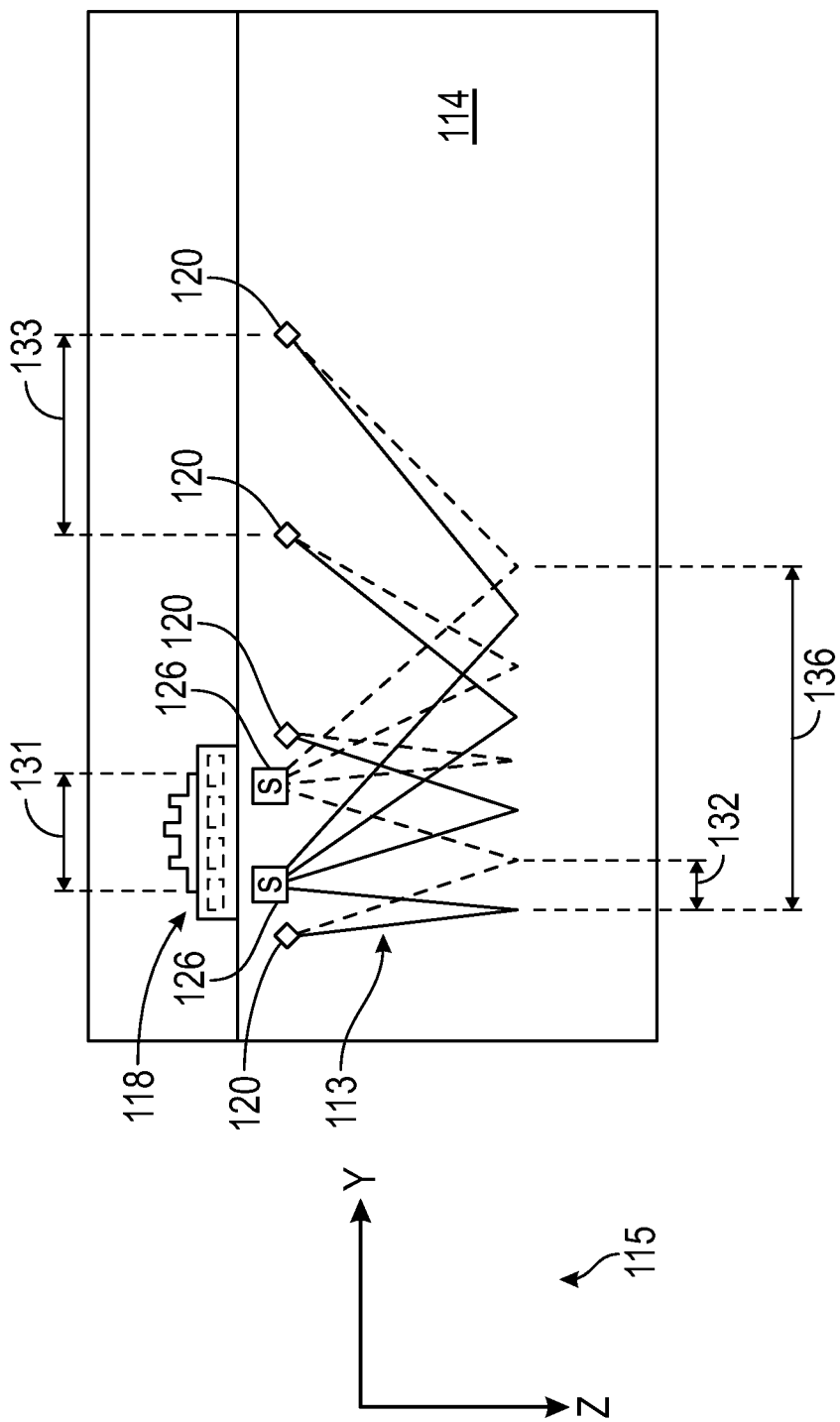

SURVEYING WITH NON-UNIFORM SURVEY CONFIGURATION WITH WIDE-TOW SOURCE GEOMETRY

CROSS REFERENCE TO RELATED APPLICATIONS

This application claims benefit of U.S. Provisional Patent Application Ser. No. 63/083,333, filed Sep. 25, 2020, entitled "Wide-Tow Source Surveys with Non-Uniform Source Separation," which is incorporated herein by reference.

BACKGROUND

This disclosure is related generally to the field of marine surveying. Marine surveying can include, for example, seismic and/or electromagnetic surveying, among others. For example, this disclosure may have applications in marine surveying in which one or more sources are used to generate energy (e.g., wavefields, pulses, signals), and geophysical sensors—either towed or ocean bottom—receive energy generated by the sources and possibly affected by interaction with subsurface formations. Geophysical sensors may be towed on cables referred to as streamers. Some marine surveys locate geophysical sensors on ocean bottom cables or nodes in addition to, or instead of, streamers. The geophysical sensors thereby acquire survey data (e.g., seismic data, electromagnetic data) which can be useful in the discovery and/or extraction of hydrocarbons from subsurface formations.

Heretofore, a standard marine survey configuration may include a streamer spread (e.g., a regular streamer spread) having a streamer separation (i.e., nominal crossline distance between adjacent streamers) of about 100 m. For example, a standard marine survey configuration may include four sources having a source separation (i.e., nominal crossline distance between adjacent sources) of about 25 m. Such standard marine survey configurations provide a sampling grid bin size of 12.5 m in the crossline direction. However, such standard marine survey configurations may not provide sufficient and/or uniform near-offset data distribution. Moreover, the acquisition efficiency (e.g., towing costs, operational risks, work hours) may be limited by the number of acquisition paths (or "sail lines") traversed to provide adequate data coverage of the survey area.

To improve the near-offset data distribution, and/or to improve the acquisition efficiency, it may be useful to increase the source spread width (i.e., the nominal crossline distance from port-most source to starboard-most source). However, increasing the source separation can produce overlapping common midpoint (CMP) positions, resulting in loss of traces in the dataset.

It would be beneficial to improve near-offset data distribution without loss of either acquisition efficiency or loss of traces in the dataset.

BRIEF DESCRIPTION OF THE DRAWINGS

So that the manner in which the features of the present disclosure can be understood in detail, a more particular description of the disclosure may be had by reference to embodiments, some of which are illustrated in the appended drawings. It is to be noted, however, that the appended drawings illustrate only exemplary embodiments and are therefore not to be considered limiting of its scope, which may apply to other equally effective embodiments.

FIG. 1A illustrates an side view of an exemplary survey vessel towing a seismic source and a streamer, located in a body of water. FIG. 1B illustrates an overhead view of the elements of FIG. 1A.

FIG. 2A illustrates a rear view of a survey vessel towing two seismic sources and four streamers through a body of water.

FIG. 3B also illustrates CMP sublines that result from that survey configuration.

FIG. 4 also illustrates crossline bin size and position for that survey configuration.

FIG. 5 also illustrates crossline bin size and position for that survey configuration.

DETAILED DESCRIPTION

Figure 2B:
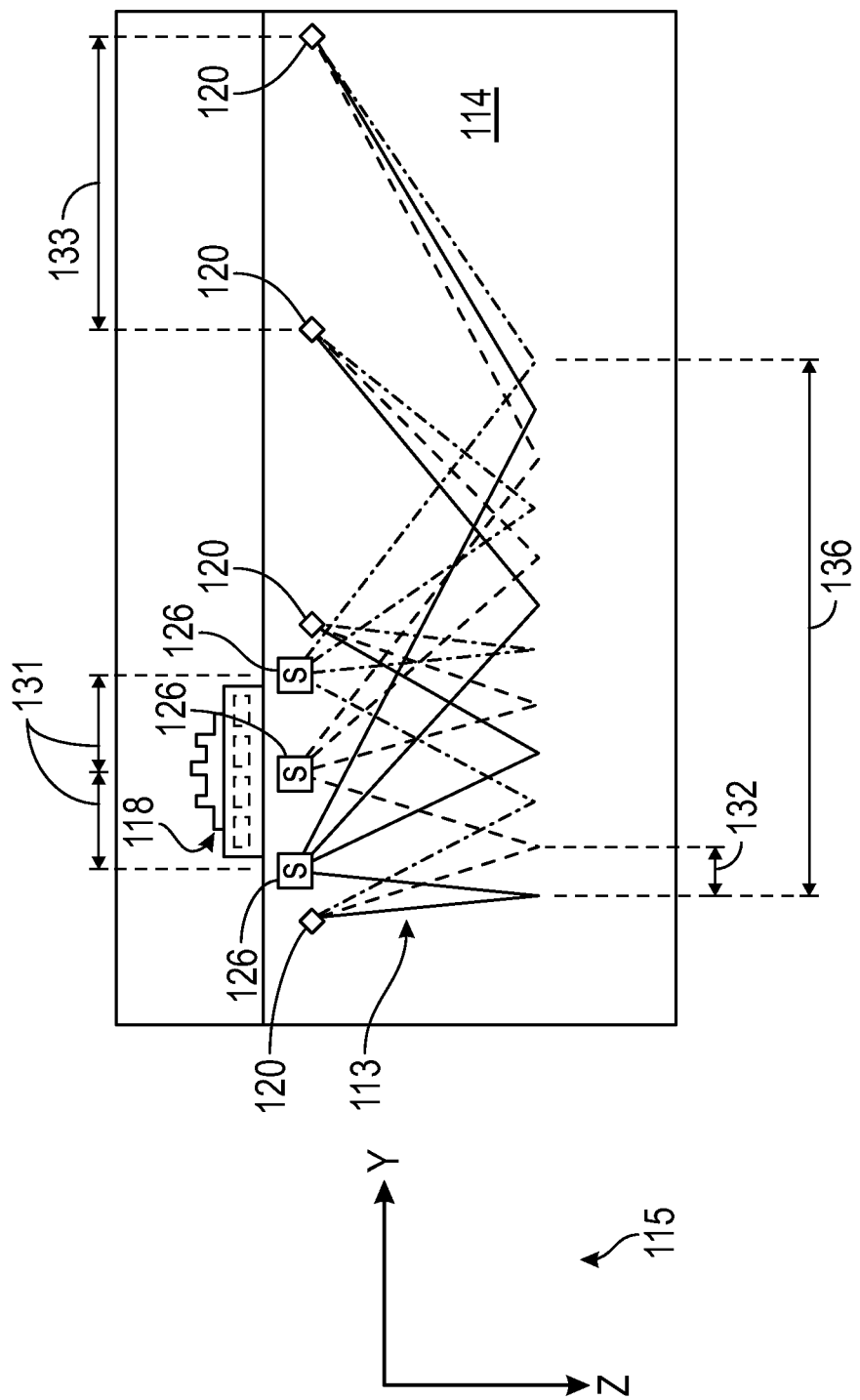
FIG. 2B illustrates a rear view of a survey vessel towing three seismic sources and four streamers through a body of water.

It is to be understood the present disclosure is not limited to particular devices or methods, which may, of course, vary.

It is also to be understood that the terminology used herein is for the purpose of describing particular embodiments only, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected. The word "exemplary" is used herein to mean "serving as an example, instance, or illustration." Any aspect described herein as "exemplary" is not necessarily to be construed as preferred or advantageous over other aspects. The term "uniform" means substantially equal for each sub-element, within about +−10% variation. The term "nominal" means as planned or designed in the absence of variables such as wind, waves, currents, or other unplanned phenomena. "Nominal" may be implied as commonly used in the field of marine surveying.

As used herein, the term "inline" or "inline direction" shall mean, for equipment towed by a vessel, a direction along (or parallel to) the path traversed by the vessel.

As used herein, the term "crossline" or "crossline direction" shall mean, for equipment towed by a vessel, a fixed-depth direction perpendicular to the path traversed by the vessel.

As used herein, the terms "cable" or "line" shall mean a flexible, axial load carrying member that may also comprise electrical conductors and/or optical conductors for carrying electrical power and/or signals between components. Such a "cable" or "line" may be made from fiber, steel, other high strength material, chain, or combinations of such materials.

As used herein, the term "streamer" shall mean an apparatus (e.g., a cable) that may be towed behind a survey vessel to detect and/or measure geophysical signals (e.g., seismic signals, electromagnetic signals). A streamer may include detectors, sensors, receivers, and/or other structures (e.g., hydrophones, geophones, electrodes) positioned along or within the streamer and configured to detect and/or measure the geophysical signals. Streamers may be towed in arrays, distributed in at least the crossline direction, and referred to collectively as a "spread" or a "streamer spread."

As used herein, the phrase "streamer separation" refers to the nominal crossline distance between adjacent streamers.

As used herein, the phrase "regular streamer spread" refers to a streamer spread having uniform streamer separation for each adjacent streamer pair.

As used herein, the term "midline" refers to a centerline of a survey vessel, extending inline behind the survey vessel to the farthest element of the survey (e.g., the tail end of a streamer spread). Typically, for towing efficiency, the sources and/or the streamer spread will be centered on the midline.

As used herein, the term "survey vessel" or simply "vessel" shall mean a watercraft, manned or unmanned, that is configured to tow, and in practice does carry and/or tow, one or more geophysical sources and/or one or more geophysical streamers.

As used herein, the phrase "source separation" refers to the nominal crossline distance between adjacent sources.

As used herein, the phrase "narrow-tow source geometry" refers to a towing configuration with at least two sources and at least two streamers, where the source separation is no more than the streamer separation (proximal the midline) divided by the number of sources.

As used herein, the phrase "wide-tow source geometry" refers to a towing configuration with at least two sources and at least two streamers, where the source separation is greater than the streamer separation (proximal the midline) divided by the number of sources (i.e., greater than the sources separation in a narrow-tow source geometry). In some embodiments the towing configuration having wide-tow source geometry may utilize more than one survey vessel.

As used herein, the term "forward" or "front" shall mean the direction or end of an object or system that corresponds to the intended primary direction of travel of the object or system.

As used herein, the terms "aft" or "back" shall mean the direction or end of an object or system that corresponds to the reverse of the intended primary direction of travel of the object or system.

As used herein, the terms "port" and "starboard" shall mean the left and right, respectively, direction or end of an object or system when facing in the intended primary direction of travel of the object or system.

As used herein, the term "survey data" shall mean data utilized by and/or acquired during a survey, including detected signals, seismic data, electromagnetic data, pressure data, particle motion data, particle velocity data, particle acceleration data, clock data, position data, depth data, speed data, temperature data, etc.

As used herein, the term "obtaining" data or information shall mean any method or combination of methods of acquiring, collecting, synthesizing, designing, or accessing data or information, including, for example, directly measuring or sensing a physical property, receiving transmitted data, selecting data from a group of physical sensors, identifying data in a data record, generating data or information manually and/or programmatically, and retrieving data or information from one or more data libraries.

Commonly, survey data may include detected signals that are identified by respective source-receiver geometry. For example, a horizontal (i.e., perpendicular to depth) midpoint (typically a halfway point) between a particular source-receiver pair may identify signal data acquired by actuating the source and detecting the ensuing signal at the receiver. Survey data may be binned by overlaying a horizontal sampling grid (based on nominal locations of midpoints) over the survey area, and subdividing the signal data into sampling grid bins based on the actual location of each midpoint on the sampling grid. The acquisition sampling grid aligns axes along the inline and crossline directions of the nominal survey acquisition paths. (Note that data processing techniques may introduce sampling grids that are off-axis with respect to the acquisition sampling grid. Unless otherwise specified, as used herein, "sampling grid" implies axes aligned along the inline and crossline directions of the nominal survey acquisition paths.) The number of the midpoints (signifying unique source-receiver pairs) within each sampling grid bin defines the fold for that bin. As used herein, a regular sampling grid has uniform fold for each bin.

As used herein, the term "offset" of a source-receiver pair means the horizontal (i.e., perpendicular to depth) distance from the source to the receiver. "Nearest offset" of a sampling grid bin means the smallest offset obtained for each source-receiver pair identified with that bin. "Nearest offset distribution" of a survey means the collection of the nearest offsets for all of the bins of the sampling grid.

If there is any conflict in the usages of a word or term in this specification and one or more patent or other documents that may be incorporated herein by reference, the definitions that are consistent with this specification should be adopted for the purposes of understanding this disclosure.

The present disclosure generally relates to marine seismic/electromagnetic survey methods and apparatuses, and, at least in some embodiments, to novel source and streamer configurations, and their associated methods of use.

One of the many potential advantages of the embodiments of the present disclosure is that marine survey data may be acquired with a non-uniform survey configuration with wide-tow source configuration. For example, the non-uniform survey configuration may include non-uniform source separations and/or non-uniform streamer separations. Data acquired with a non-uniform survey configuration with wide-tow source geometry may provide improved distribution of near-offset data over that of standard marine survey configurations. For example, some disclosed embodiments include towing sources closer (than standard marine survey configurations) to the outer streamers, resulting in smaller nearest offsets for the outer streamers. Another potential advantage includes wider streamer spreads without increasing or with minimal increase of the nearest offset to the outer streamer. For example, some disclosed embodiments include towing streamers with non-uniform streamer separation to widen the spread while towing sources closer to the outer streamers. Wider streamer spreads may beneficially improve the survey efficiency by reducing the number of sail lines utilized to cover the survey area. Advantageously, disclosed embodiments may wide-tow the sources in a non-uniform geometry while maintaining uniform CMP coverage.

In some embodiments, towing configurations may include a non-uniform surveying configuration. In some embodiments, towing configurations may include a wide-tow source geometry. In some embodiments, the common midpoint (CMP) positions for all source-receiver combinations in each sampling grid bin are unique (i.e., there is no redundant data). In some embodiments, the CMP positions have a uniform crossline separation. In some embodiments, the quality of the acquired data may be improved (over that of standard marine survey configurations) by an improved distribution of near-offset data. In some embodiments, the acquisition efficiency of the survey can be improved (over that of standard marine survey configurations) by using more streamers and/or wider streamer spread with minimal loss of near-offset data distribution. Another potential advantage of the embodiments of the present disclosure is that robust marine survey data may be acquired more efficiently than previously, with lower costs and lower operational risks. For example, non-uniform survey configurations with wide-tow source geometries may allow for more robust acquisition of near-offset data. Another potential advantage includes improved turnaround efficiency and shortened completion time. For example, by utilizing non-uniform survey configurations with wide-tow source geometries, data may be acquired with uniform fold and/or regular sampling grid, obviating data processing procedures such as extensive wavefield reconstruction. Embodiments of the present disclosure can thereby be useful in the discovery and/or extraction of hydrocarbons from subsurface formations.

Traditionally, marine seismic sources have been towed between and in front of the two innermost streamers of a regular streamer spread. However, a wider source separation may improve the near-offset data distribution without sacrificing survey efficiency. This may be especially relevant for survey areas with relatively shallow targets (e.g., less than about 200 m below bottom of the body of water), where good near-offset or near-angle data distribution allows for robust AVO analysis and/or for effective multiples removal.

Wide-tow source geometries may also extend the CMP data coverage per sail line. In other words, the so-called "CMP brush" becomes wider. The CMP brush acquired per sail line increases with the number of sources and/or the number of streamers. The CMP brush width depends on the source separations and the streamer separations. Thus, a wider source separation produces a wider CMP brush, but may locally result in a sparser crossline sampling. It is common practice to acquire marine seismic data with uniform fold and regular sampling grid by way of narrow-tow source geometry with a regular streamer spread. In contrast, survey configurations applicable to compressive sensing-based survey design (Mosher et al., 2017) and/or Fresnel zone-driven configurations (Hager et al., 2015) may sacrifice uniform fold and/or regular sampling grid constraints. When acquiring a seismic survey with wide-tow source geometries, a regular sampling grid can be achieved by means of overlapping the CMP brushes. Ultimately, the combination of wide-tow source geometries with high streamer counts may enable higher acquisition efficiency without trading-off near-offset data distribution or sacrificing regular crossline sampling.

As described below, a method includes wide-towing sources with a non-uniform survey configuration. For example, in one embodiment having four sources and a regular streamer spread with (uniform) streamer separation of about 100 m, the innermost two sources may have a source separation of about 25 m, while the source separation between each of the outer-most sources and the respective nearest of the innermost two sources may be about 50 m. In some embodiments, the source separation dimension may scale with streamer separation. For example, if the (uniform) streamer separation is about 50 m, the innermost source separation may be about 12.5 m, while the outer source separations (to the nearest innermost source) may be about 25 m. In some embodiments, non-uniform survey configuration with wide-tow source geometry may also be applicable to a six source (i.e., hexa-source) survey configuration, and/or survey configurations with other numbers of sources (e.g., three, five, seven, eight, etc.).

FIGS. 1A-1B illustrate coordinates and terminology associated with marine surveying according to one or more embodiments of the present disclosure. FIG. 1A illustrates side or xz-plane 119 view of an exemplary survey vessel 118 towing a seismic source 126 and a streamer 120, located in a body of water 114. As illustrated, a lead-in line 111 couples each streamer 120 to the survey vessel 118. FIG. 1B illustrates an overhead or xy-plane 117 view of the elements of FIG. 1A. FIGS. 1A-1B together illustrate a Cartesian coordinate system used to specify coordinate locations within the body of water 114 and subsurface formation (e.g., below the bottom 122 of the body of water 114) with respect to three orthogonal, coordinate axes labeled x, y and z. The x coordinate uniquely specifies the position of a point in a direction parallel to the path of travel of the survey vessel 118 at a particular point in time, the y coordinate uniquely specifies the position of a point in a direction perpendicular to the x axis and substantially parallel to the surface 123 of the body of water 114 at survey vessel 118, and the z coordinate uniquely specifies the position of a point perpendicular to the xy-plane. The inline separation between elements is measured in the x-direction; the crossline separation between elements is measured in the y-direction, and the depth separation between elements is measured in the z-direction. The total separation can thus be expressed as a function of the three separation components. The surface 123 is the hypothetical surface of the sea level at survey vessel 118 and is used to define zero elevation (i.e., z=0).

In various embodiments, the seismic source 126 can include one or more air guns and/or marine vibrators, among other common seismic source components. Although illustrated as a point, the seismic source 126 may represent a source string or a source array. The seismic source components may be towed at one or more depths and may be suspended from one or more floats at the surface. The source arrays may have any of a variety of configurations. The seismic source components of a single seismic source (e.g., seismic source 126) work together to emit a pulse of energy. For example, the seismic source components may be towed relatively close together (separated by about 2 m-about 15 m), and/or the seismic source components may be actuated relatively close together in time (simultaneously or separated by no more than about 0.1 s). In some embodiments, seismic source 126 may be towed at about 2 m to about 20 m depth, or more particularly about 5 m to about 10 m depth. The survey vessel 118 can include a source controller. For example, the controller can be coupled to the seismic source 126 and configured to control actuation of the seismic source 126 as described herein.

The streamers 120 are typically long (e.g., about 5 km to about 10 km) cables containing power and/or data-transmission lines (e.g., electrical, optical fiber, etc.) to which receivers 105 may be coupled. Receivers 105 may be spaced along each streamer 120. Receivers 105 can include, for instance, seismic receivers configured to detect energy originating from seismic source 126. The offset of a source-receiver pair may be determined by the location of the receiver 105 on a streamer 120, the length of the streamer 120, and the towing geometry (including the towing configuration of the source 126 and the towing configuration of the streamer 120). Ultra-near offsets may be about 1 km or less. Near offsets may be about 1 km to about 2.5 km. Mid offsets may be about 2.5 km to about 7.5 km. Far offsets may be about 7.5 km to about 10 km. Long offsets may be about 10 km to about 20 km. Very-long offsets may be greater than about 20 km. These definitions of offset classes may vary by target depth, streamer length, and other operational circumstances. Each seismic receiver can detect pressure and/or particle motion in the water and/or can be responsive to changes in the pressure and/or particle motion with respect to time. The seismic receivers can include hydrophones, geophones, pressure sensors, particle motion sensors, among other types of seismic sensors, and/or combinations thereof. The streamers 120 and the survey vessel 118 can include sensing electronics, data recording components, and/or data processing facilities that allow marine survey receiver readings to be correlated with absolute positions on the sea surface and absolute three-dimensional positions with respect to the three-dimensional coordinate system (e.g., xz-plane 119 and xy-plane 117). Although FIGS. 1A and 1B illustrate streamers that are parallel to the x-axis, the streamers may diverge somewhat from parallel (for example, streamer fanning may progressively increase the crossline separation between two adjacent streamers as distance from the survey vessel increases).

FIG. 1A includes an illustration of a shot (i.e., actuation of a source 126) and down-going wave routes 142 from the seismic source 126. Energy from seismic source 126 travels into the subsurface formation below the bottom 122 of body of water 114, changing direction due to interaction with rocks, materials, or any reflector (e.g., geological structure) in the subsurface formation. Up-going wave routes 143 represent energy redirected by the subsurface formation towards receivers 105-1 and 105-2.

FIG. 1B illustrates a top or xy-plane 117 view of the survey vessel 118 towing two seismic sources 126-1, 126-2, and four streamers 120-1, 120-2, 120-3, 120-4 located beneath a surface 123 of body of water 114. An array of sources is referred to as a "source spread." In some embodiments, the source separation 131 is about 25 m to about 250 m, or even larger. In some embodiments, separation cables, deflectors, or other towing equipment (not shown) may be utilized to maintain a consistent source separation 131. In some embodiments, the streamer separation 133 is about 25 m to about 250 m. In the illustrated embodiment, the streamer separation 133 between each adjacent streamer pair is equal (uniform). The four streamers 120-1, 120-2, 120-3, 120-4, having uniform streamer separation between each adjacent streamer pair, thereby comprise a regular streamer spread. The streamer spread width 135 is the nominal crossline distance from the port-most streamer to the starboard-most streamer. For regular streamer spreads with N streamers, $$\text{spread width} = (N-1) \times \text{streamer separation} \quad (1)$$

The midline 110 represents the tow path along the centerline of the survey vessel 118, extending behind the survey vessel to the farthest element of the survey, for example the most distal point of the longest streamer 120. When straight-line towing, the nominal path of the streamers 120 (without disturbance by cross currents, etc.) parallels the midline 110. The midline 110 defines y=0. For each sail line of a survey plan, the midline 110 nominally aligns with the sail line.

Embodiments are not limited to a particular number of streamers and can include more streamers or fewer streamers than are shown in FIG. 1B. Some embodiments can, for example, include up to 24 or more streamers. As illustrated, the streamer spread can be modeled as a planar horizontal acquisition surface located beneath the surface 123 of body of water 114. However in practice, the acquisition surface can be smoothly varying due to active sea currents and/or weather conditions. In other words, the towed streamers may also undulate as a result of dynamic conditions of the fluid. The coordinates of a particular receiver are given by (x, y, z) taking into account both the xz-plane 119 and the xy-plane 117. In some embodiments, the streamer spread may vary in the z direction. For example, streamers may be slanted such that receivers disposed farther from the survey vessel may be deeper than those closer to the survey vessel. Other examples include combination of horizontal and slanted depth profiles, sinusoidal depth profiles, and "snake" depth profiles. Likewise, in some embodiments, one or more of the streamers may be towed at a different depth than other streamers, thereby creating an acquisition volume.

Note the angle of the lead-in lines 111 to the midline 110 in FIG. 1B. It should be appreciated that, for a fixed nearest offset 112, the angle for the outer-most streamers increases as the streamer spread width 135 increases. It should also be appreciated that towing efficiency decreases as the angle increases. Consequently, streamer spread width 135 may be limited by towing capacity. Said another way, in order to increase streamer spread width 135, towing capacity may dictate an increased nearest offset 112.

Although not illustrated, the survey vessel 118 may include equipment, referred to herein generally as a "recording system", that may provide and/or include navigation control, navigation monitoring, including position determination, seismic source control, seismic source monitoring, receiver control, receiver monitoring, survey data recording, time monitoring, and/or time synchronization between the various control, monitoring, and/or recording components.

Many marine seismic surveys deploy a dual-source setup, as illustrated in FIG. 2A. FIG. 2A illustrates a rear or yz-plane 115 view of the survey vessel 118 towing two seismic sources 126 and four streamers 120 through a body of water 114. The dual-source setup has two independently-activated seismic sources 126 towed by a single survey vessel 118 at a source separation 131. Some marine seismic surveys deploy a triple-source setup, as illustrated in FIG. 2B. The triple-source setup has three independently-activated seismic sources 126 towed by a single survey vessel 118 at source separations 131. Although not illustrated, it should be understood that some marine seismic surveys deploy higher numbers of independently-activated sources (e.g., quad-source setup, penta-source setup, hexa-source setup, etc.). Each of FIGS. 2A and 2B is a functional diagram, essentially looking from the tail of the streamers 120 (which have receivers thereon) towards the stern of the survey vessels 118. FIGS. 2A and 2B show ray paths 113 between the seismic sources 126 and streamers 120. As illustrated, the dual-source setup and the triple-source setup each have the same source separation 131, though the triple-source setup of FIG. 2B has twice the source spread width (i.e., the nominal crossline distance from port-most source to starboard-most source) as the dual-source setup of FIG. 2A. As illustrated, the dual-source setup and the triple-source setup each have the same crossline bin width 132. As illustrated, the triple-source setup has a 50% larger streamer separation 133 and crossline subsurface illumination 136 than the dual-source setup. Hence, a triple-source setup can provide greater streamer separation and greater acquisition efficiency. Since the triple-source setup has a larger crossline subsurface illumination, it is expected to utilize fewer sail lines to cover the same acquisition footprint as the dual-source setup. Alternatively, a triple-source setup with the same streamer separation 133 as a dual-source setup would have a narrower crossline bin width 132 (implying denser data sampling). Hence, a triple-source setup can provide better crossline sampling than a dual-source setup, and thereby provide images with improved spatial resolution. Similarly, with narrower crossline bin widths 132, a triple-source setup may have less aliasing noise, and can thereby acquire higher frequency seismic data than a dual-source setup.

Figure 3A:
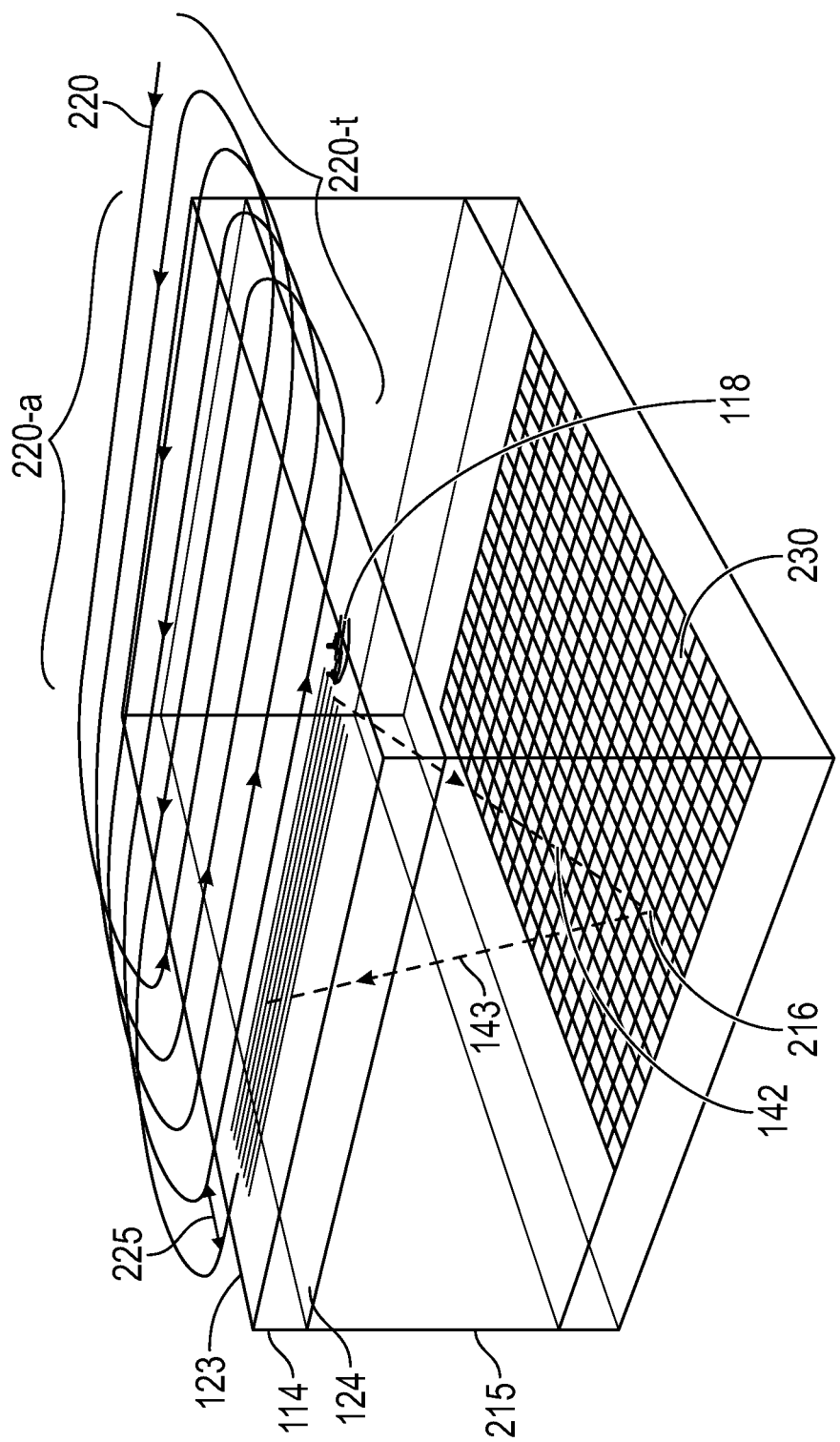
FIG. 3A illustrates a survey vessel conducting a marine survey according to a "race-track" survey design.

FIG. 3A illustrates a survey vessel 118 conducting a marine survey according to a "race-track" survey design. Survey vessel 118 is shown following a path 220. The path 220 includes linear (e.g., nominally straight-line) portions, acquisition paths 220-a (also known as "sail lines"), wherein survey data acquisition may occur. The path 220 also includes curved portions, turn paths 220-t, wherein the survey vessel turns between acquisition paths, and wherein survey data acquisition may not occur. Typically, the acquisition paths 220-a would be nominally parallel, and adjacent acquisition paths 220-a would be equally spaced apart throughout the entire survey area. The sail-line separation 225 between adjacent acquisition paths 220-a is related to the streamer spread width 135 and the density of survey data desired. The related parameters may be selected to generate contiguous or "tiled" areas of subsurface illumination. For example, for a survey with a regular streamer spread having N streamers and a uniform nominal sail-line separation:

$$\text{Sail-line separation} = 0.5 \times N \times \text{streamer separation} \quad (2)$$

As illustrated, the survey vessel 118 travels in one direction on four adjacent acquisition paths 220-a, and in the opposite direction on the next four adjacent acquisition paths 220-a. Each set of adjacent acquisition paths with a common shooting direction is referred to as a "swath".

As would be understood by one of ordinary skill in the art with the benefit of this disclosure, other applicable survey designs provide acquisition paths 220-a that are not linear for example, circular towing and/or spiral towing. In some instances, such survey designs may minimize the time the survey vessel 118 spends not acquiring survey data. For simplicity, the following discussion focuses on straight-line acquisition paths 220-a. Common methods for marine surveying and data processing may be used to adapt the following discussion to non-straight-line procedures.

FIG. 3A also illustrates survey vessel 118 traveling through body of water 114 above subsurface formation 215. A seismic source (not shown) towed by survey vessel 118 generates energy that follows, for example, exemplary down-going wave route 142 through body of water 114 and into subsurface formation 215. Similar to down-going wave routes 142 of FIG. 1A, the generated energy may be illustrated as following any one of a number of down-going wave routes. As illustrated, the energy intersects a reflector 216 in the subsurface formation 215, causing the energy to propagate along up-going wave route 143. Reflector 216 may be, for example, an interface between geological structures. Sampling grid 230 is modeled at the depth of reflector 216. Although the subsurface geology is rarely flat, common data processing techniques may model interfaces as flat (uniform depth) for at least a portion of the calculations. Generally, the size of the sampling grid bins is determined based on the desired resolution of the resulting picture of the subsurface formation 215. By considering all possible wave routes from all available seismic source-receiver pairs, the associated seismic trace from each seismic source-receiver pair may be determined. Typically, each bin of sampling grid 230 may contain about 60 traces. A single common midpoint may be determined where the survey data from the receivers may be stacked to maximize the fold. More particularly, the dimensions of each bin are related to the inline receiver separation along the streamers (e.g., about 12.5 m), and the streamer separation (133 in FIG. 2A). The dimensions of each bin are also related to the number of seismic sources being utilized (e.g., single-source setup, dual-source setup, triple-source setup, etc.). For a survey with a regular streamer spread, the crossline bin width (proximal the midline (e.g., no more than about 10% of the streamer spread width away from the midline)) is given by:

$$\text{Crossline bin } width_{midline} = 0.5 \times \frac{\text{streamer separation}}{\text{number of sources}} \quad (3)$$

Smaller bin width (narrower bins) correspond to higher survey sampling density, and consequently higher resolution of the resulting picture of the subsurface formation 215.

Figure 3B:
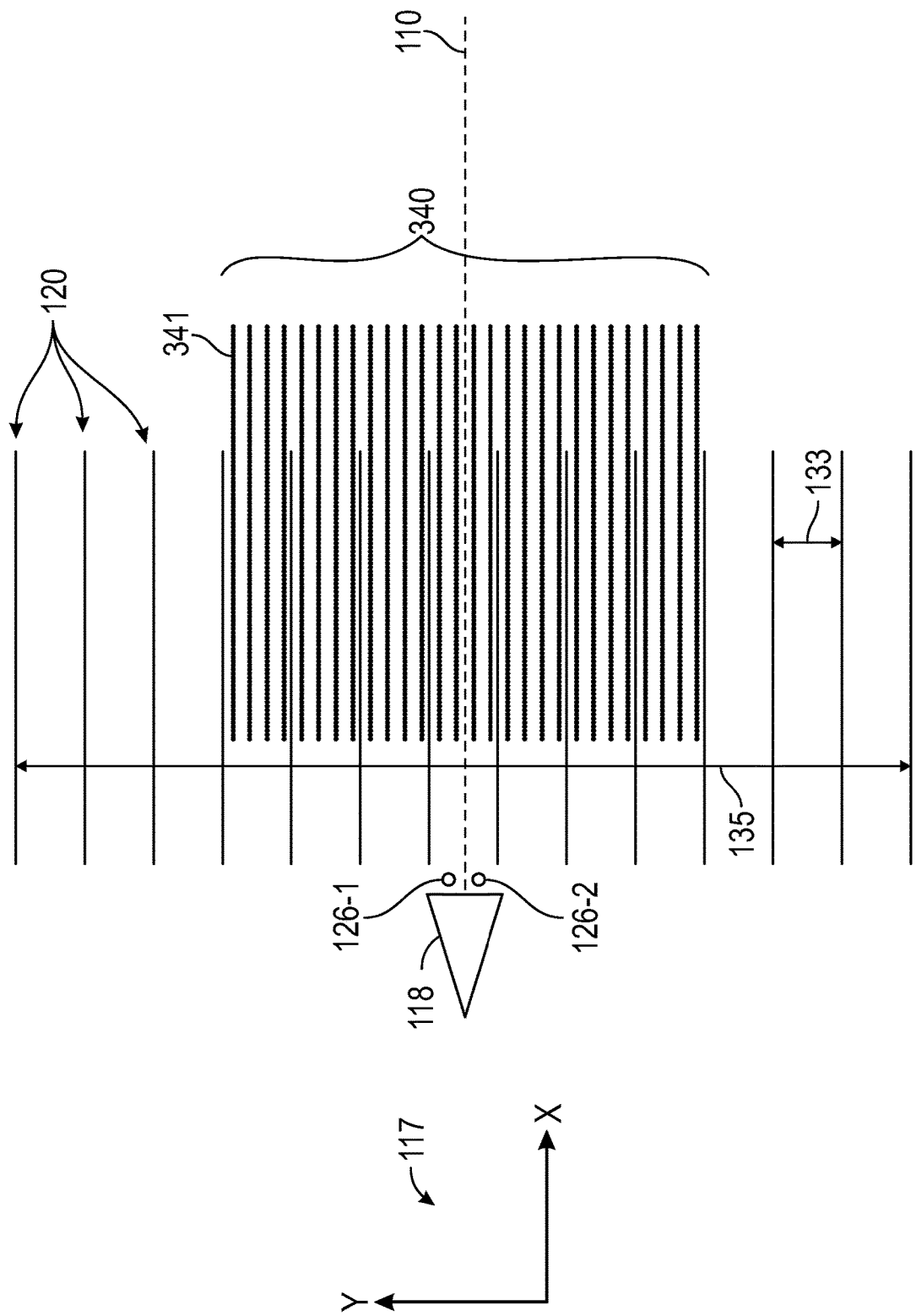
FIG. 3B illustrates an overhead view of a survey vessel towing two seismic sources and fourteen streamers through a body of water.

The center of each bin in sampling grid 230 is referred to as the "Common Midpoint" (CMP). Using the flat geology assumption, the location of each subsurface reflection point is at a midpoint between the respective source and receiver coordinates for each wave route. Data detected by receivers (e.g., receivers 105 from FIGS. 1A, 1B) may be identified with bins from sampling grid 230 based on the CMP of each datum. Such data may be grouped into sublines of data based on the respective bins, resulting in CMP sublines. Thus, a bin may be said to be "populated" by the respective subline when data is acquired for the respective CMP. A bin may be said to be "empty" when data is not acquired for the respective CMP. The survey configuration thereby determines predicted (or nominal) CMP sublines 341 (sometimes referred to simply as "sublines"), as illustrated in FIG. 3B. The area where the CMP sublines 341 are uniformly distributed for a given acquisition path 220-a may be referred to as an area of uniform CMP coverage 340. A marine survey may be designed to "tile" areas of uniform CMP coverage from adjacent acquisition paths 220-a so that the entire marine survey area will be uniformly covered.

Figure 4:
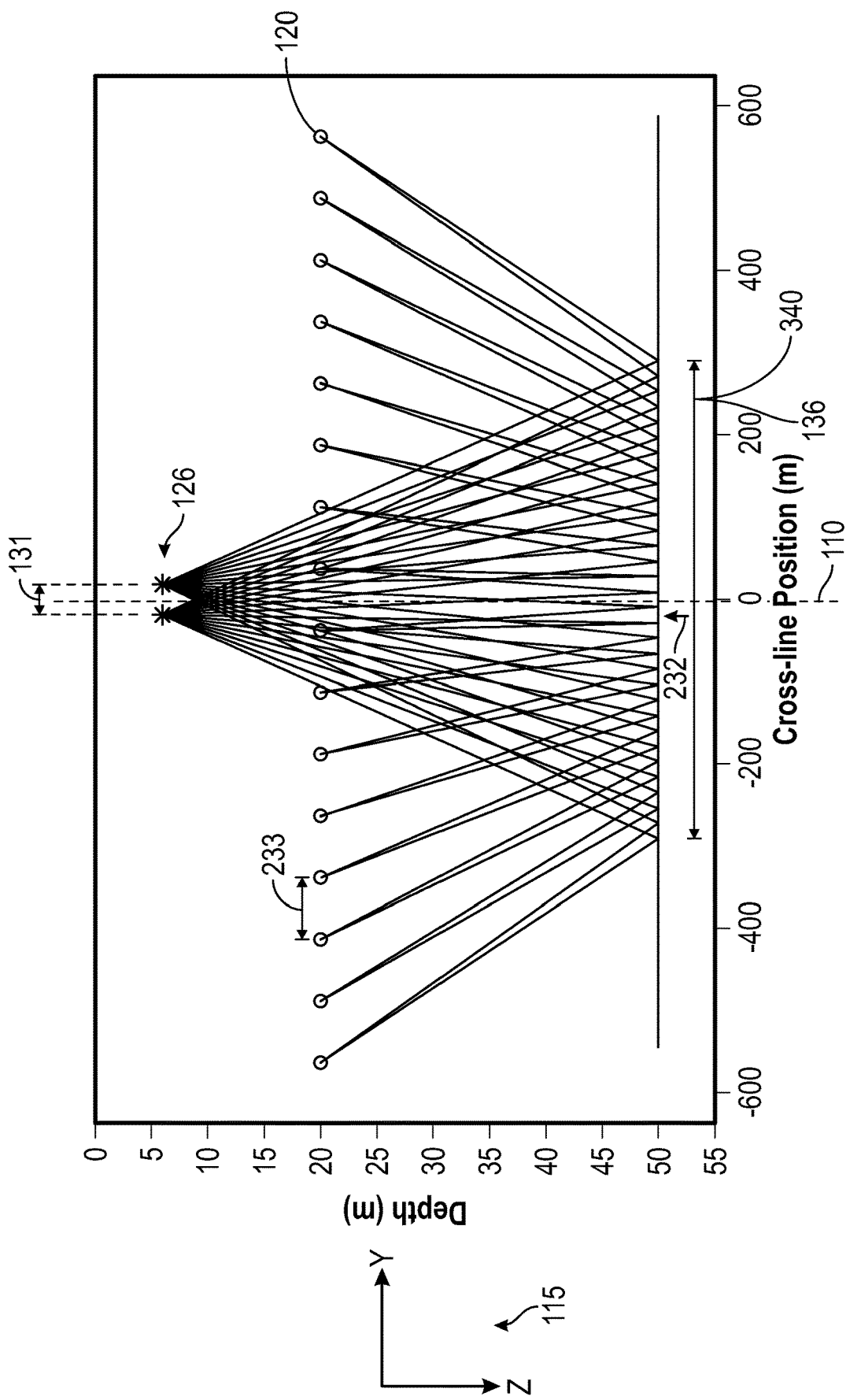
FIG. 4 illustrates a yz-plane view of an exemplary survey configuration having two seismic sources in a narrow-tow source geometry and sixteen streamers in a regular streamer spread.
Figure 5:
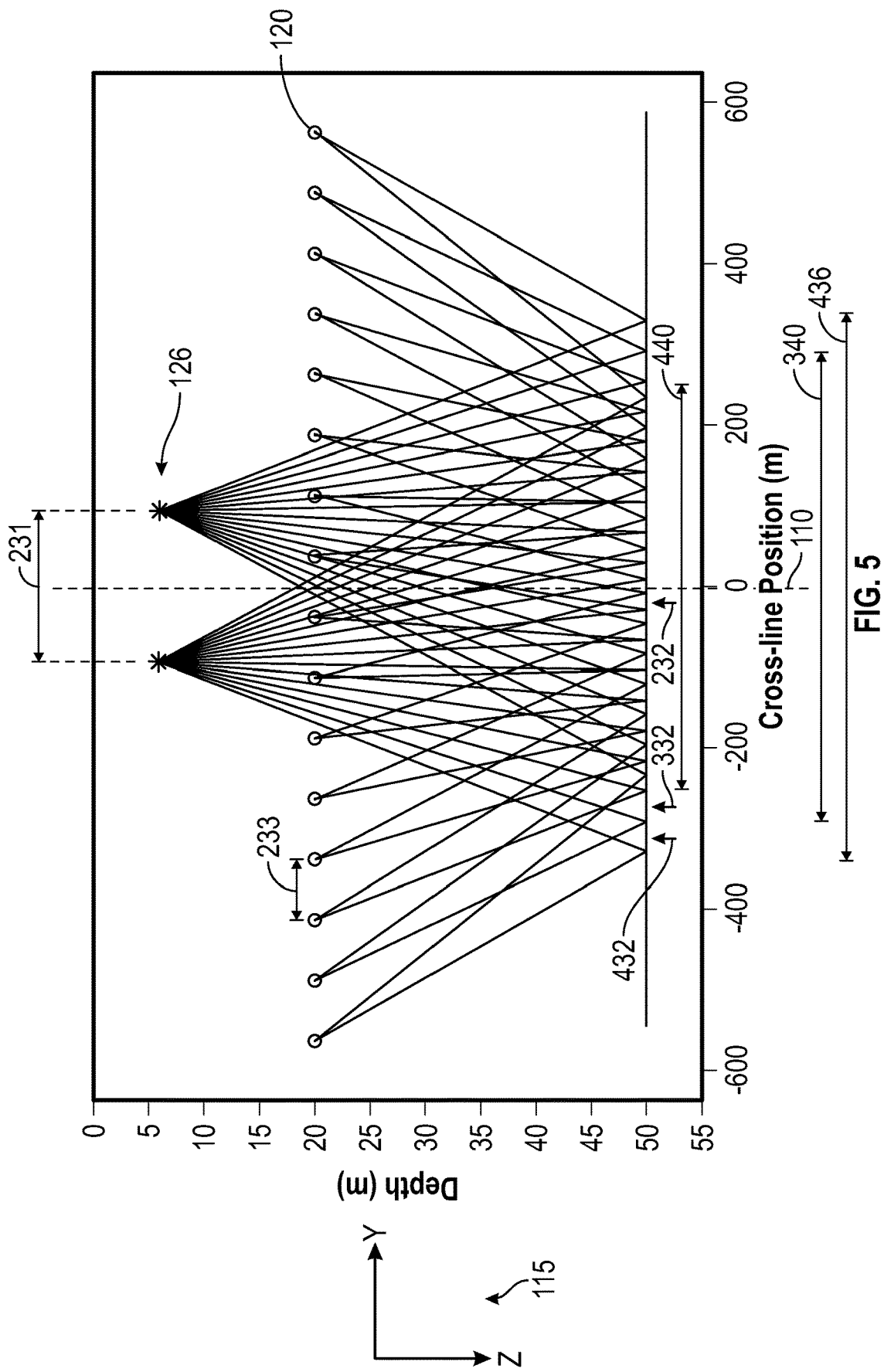
FIG. 5 illustrates a yz-plane view of an exemplary survey configuration having two seismic sources in a wide-tow source geometry and sixteen streamers in a regular streamer spread.

FIGS. 4 and 5 present a comparison of an exemplary narrow-tow source geometry to an exemplary wide-tow source geometry. FIG. 4 illustrates a yz-plane 115 view of an exemplary survey configuration having two seismic sources 126 in a narrow-tow source geometry and sixteen streamers 120 in a regular streamer spread. FIG. 4 also illustrates crossline bin size and position this survey configuration. The illustrated configuration has sixteen streamers 120 equally spaced with a streamer separation 233 of about 75 m at a nominal towing depth of about 20 m. The illustrated configuration has two sources 126 spaced apart by a source separation 131 of about 37.5 m (18.75 m on either side of the midline 110) at a depth of about 6 m. The survey vessel is not shown, but the sail line of the survey vessel may be along the midline 110. According to Equation (2), the sail-line separation is about 600 m. The area of uniform CMP coverage 340 of the survey area at a depth of about 50 m is about 500 m. In this instance, the area of uniform CMP coverage 340 corresponds to the crossline subsurface illumination 136 (compare to FIGS. 2A, 2B). Note the size and position of bin 232 (within area of uniform CMP coverage 340 and proximal the midline 110). According to Equation (3), the crossline bin width (proximal the midline) is about 18.75 m.

FIG. 5 illustrates crossline bin size and position for the exemplary regular streamer spread configuration of FIG. 4 but with the dual sources in a wide-tow source geometry. The illustrated configuration has sixteen streamers 120 equally spaced with a streamer separation 233 of about 75 m at a nominal towing depth of about 20 m. The illustrated configuration has two sources 126 spaced apart by a source separation 231 of about 187.5 m (93.75 m on either side of the midline 110) at a depth of about 6 m. The sail-line separation remains about 600 m, and the crossline bin width (proximal the midline) remains about 18.75 m. The area of uniform CMP coverage 340 and bin 232 from FIG. 4 are shown on FIG. 5 for comparison. Note that the area of uniform CMP coverage 340 from FIG. 4 is less than the crossline subsurface illumination 436. For example, bin 432 is within the crossline subsurface illumination 436, but outside of the area of uniform CMP coverage 340 from FIG. 4. Note also the width of bin 332, which is within the area of uniform CMP coverage 340 from FIG. 4, in comparison to the width of bin 232. Bin 332 and bin 432 are each about twice as wide as bin 232. Therefore, the area of uniform CMP coverage 440 for FIG. 5 is less than the area of uniform CMP coverage 340 from FIG. 4. This is an expected result of wide-tow source geometries: the crossline subsurface illumination increases, but the area of uniform CMP coverage decreases. Bin 332 and bin 432 can be described as having excessive crossline bin size.

Figure 6A:
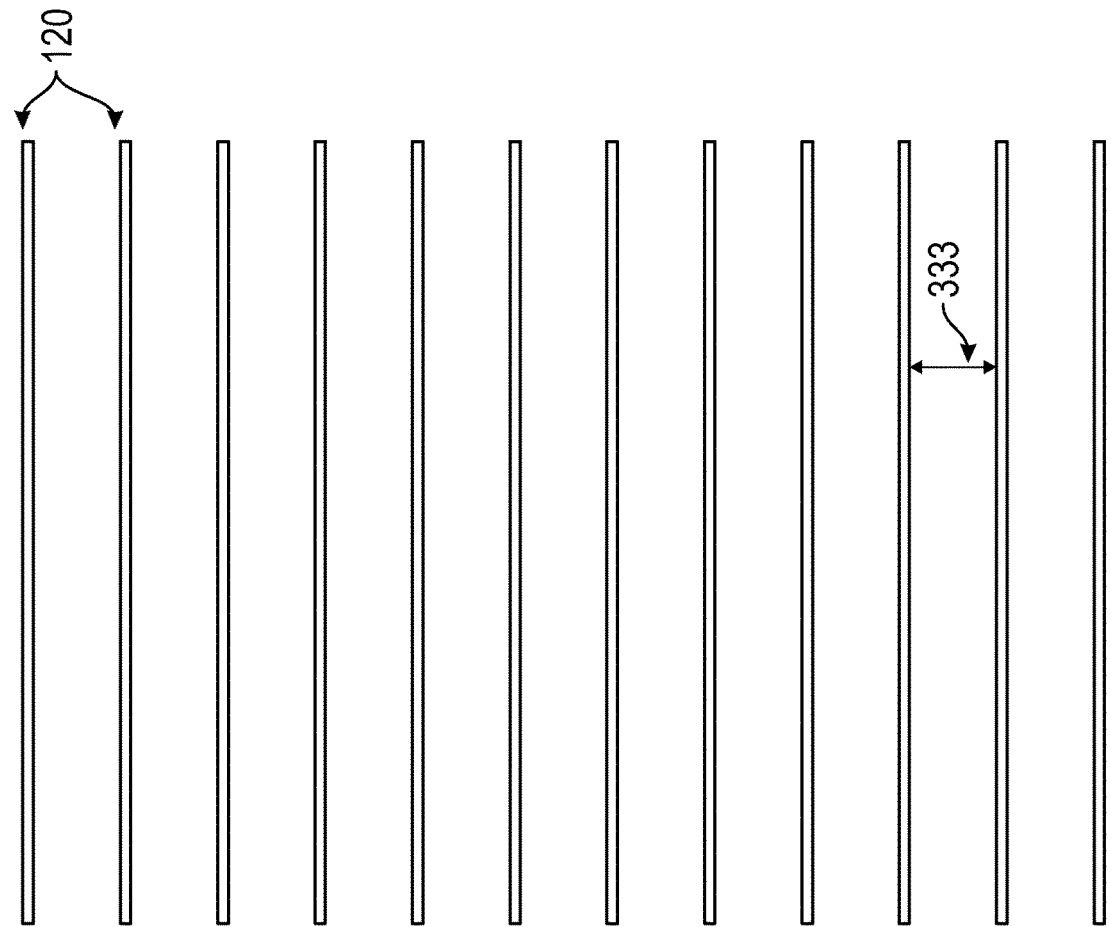
FIG. 6A illustrates an exemplary triple-source, narrow-tow source geometry with a regular streamer spread.

FIGS. 6 and 7 present another comparison of an exemplary narrow-tow source geometry to an exemplary wide-tow source geometry. FIG. 6A illustrates an exemplary triple-source, narrow-tow source geometry with a regular streamer spread. The illustrated configuration has twelve streamers 120 equally spaced (e.g., having a streamer separation 333 of about 75 m). The illustrated configuration has three sources 126 that are uniformly spaced (e.g., having a source separation of about 25 m).

Figure 6B:
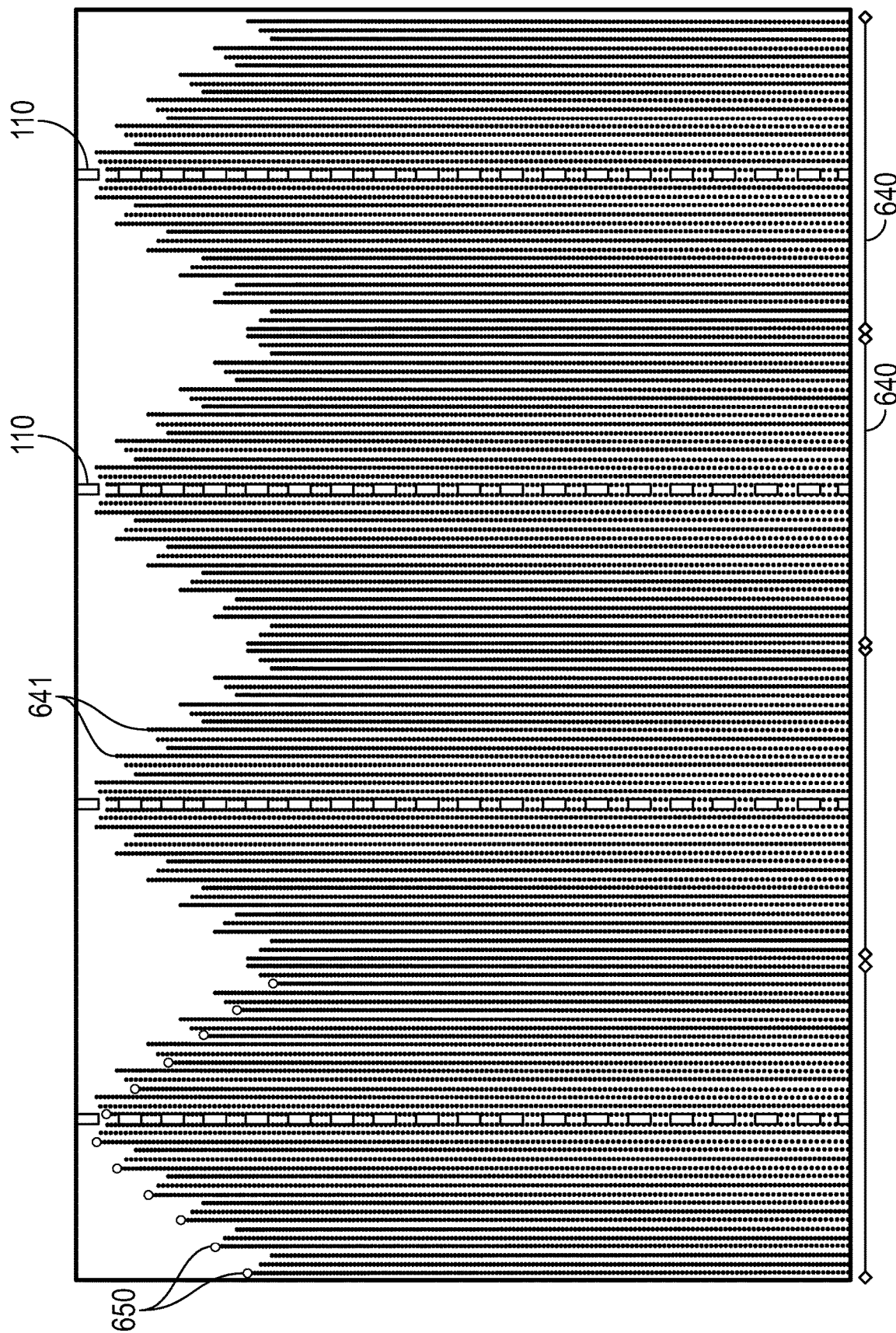
FIG. 6B illustrates the CMP sublines for four sail lines for the survey configuration of FIG. 6A.

FIG. 6B illustrates the CMP sublines 641 for four sail lines (as indicated by midlines 110) for the survey configuration of FIG. 6A. The vertical axis of FIG. 6B measures the offset of each CMP position (essentially along the x-axis of the previously-discussed Cartesian coordinate system). The horizontal axis of FIG. 6B measures the crossline survey position of each CMP position (essentially along the y-axis of the previously-discussed Cartesian coordinate system). If the configuration of FIG. 6A has a streamer separation of about 75 m and a source separation of about 25 m, then the sail-line separation would be about 450 m, and the crossline bin width (proximal the midline) would be about 12.5 m. Note the four sail lines result in four contiguous areas of uniform CMP coverage 640. The forward-most CMP positions 650 for several CMP sublines 641 (specifically, for the CMP sublines 641 for the port-most source during the first sail line) are indicated, and the relevance of forward-most CMP positions 650 will be discussed below.

Figure 7A:
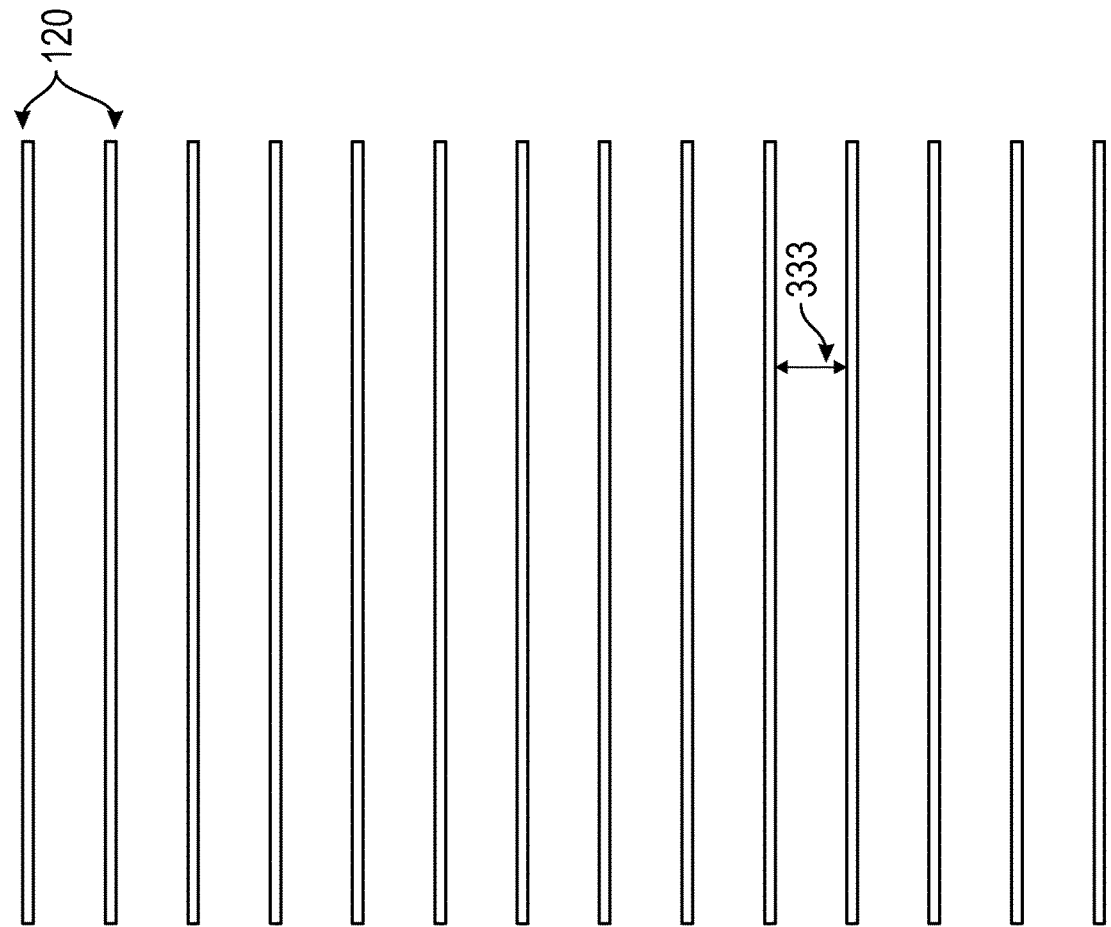
FIG. 7A illustrates an exemplary triple-source, wide-tow source geometry with a regular streamer spread.

FIG. 7A illustrates an exemplary triple-source, wide-tow source geometry with a regular streamer spread. The illustrated configuration has fourteen streamers 120 equally spaced (e.g., having a streamer separation 333 of about 75 m). The illustrated configuration has three sources 126 that are uniformly spaced (e.g., having a source separation 231 of about 100 m).

Figure 7B:
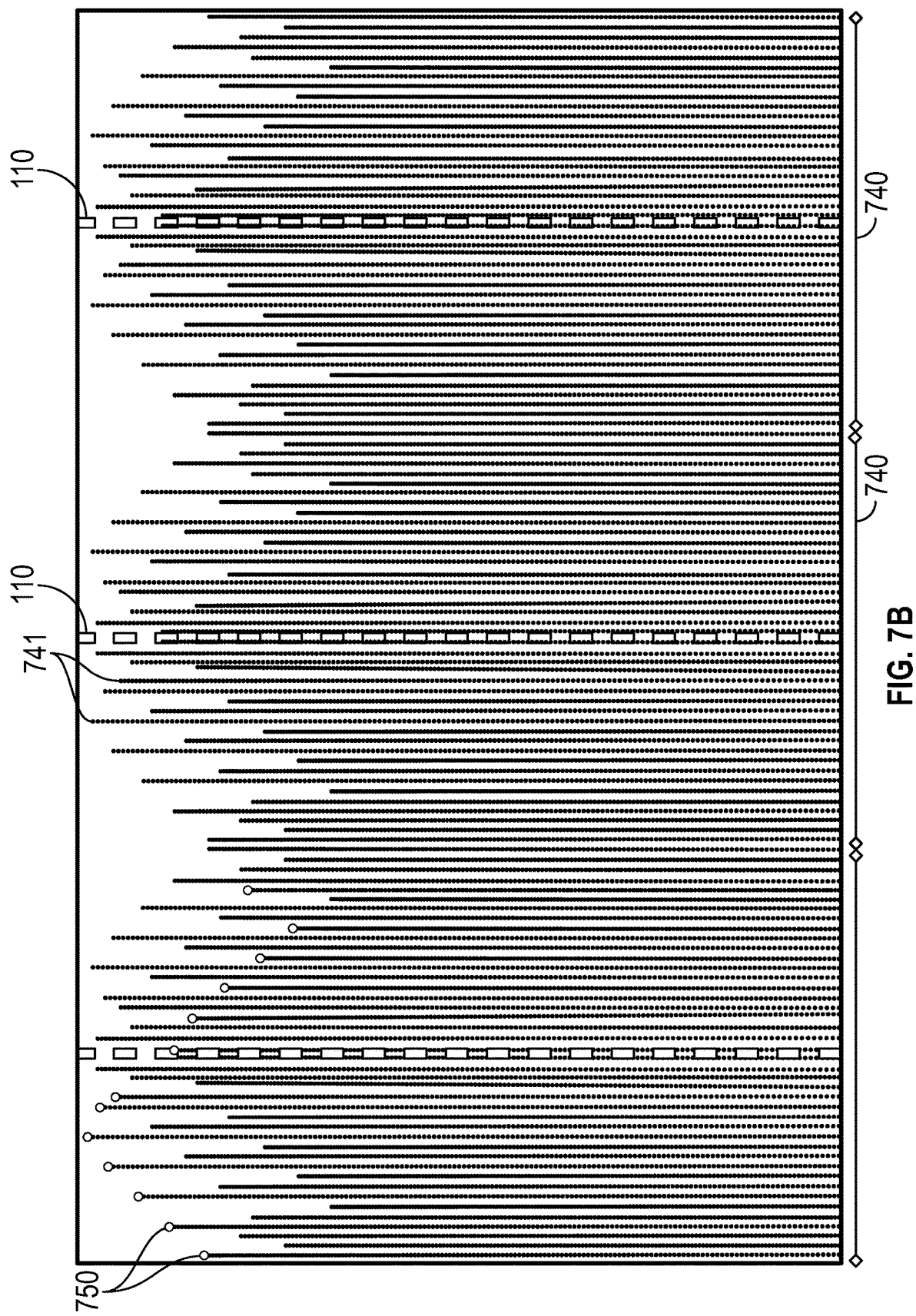
FIG. 7B illustrates the CMP sublines for three sail lines for the survey configuration of FIG. 7A.

FIG. 7B illustrates the CMP sublines 741 for three sail lines (as indicated by midlines 110) for the survey configuration of FIG. 7A. As with FIG. 6B, the vertical axis of FIG. 7B measures the offset of each CMP position (essentially along the x-axis of the previously-discussed Cartesian coordinate system), and the horizontal axis of FIG. 7B measures the crossline survey position of each CMP position (essentially along the y-axis of the previously-discussed Cartesian coordinate system). If the configuration of FIG. 7A has a streamer separation of about 75 m and a source separation of about 100 m, then the survey vessel 118 would follow a survey path with a sail-line separation of about 525 m, and the crossline bin width (proximal the midline) would remain about 12.5 m. Note the three sail lines result in three areas of uniform CMP coverage 740. The forward-most CMP positions 750 for several CMP sublines 741 (specifically, for the CMP sublines 741 for the port-most source during the first sail line) are indicated, and the relevance of forward-most CMP positions 750 will be discussed below.

An acquisition efficiency estimate for a survey may be related to the sail-line separation, since fewer sail lines mean less distance traveled, hence reduced expenses and/or operational risk. For example, an estimate of improvement in efficiency may be calculated by:

$$\text{Acquisition Efficiency Gain} = \frac{\text{new sail-line separation}}{\text{old sail-line separation}} - 1 \quad (4)$$

According to Equation (4), the acquisition efficiency gain of the wide-tow source geometry of FIG. 7A over the regular streamer spread configuration of FIG. 6A is 525/450-1, or about 17%.

Table 1 shows several exemplary wide-tow source geometries and applicable survey configurations.

TABLE 1

| Streamer Count | Streamer Separation [m] | Source Count | Source Separation [m] | Source Spread Width [m] | Crossline Bin Size [m] |
|---|---|---|---|---|---|
| 12 | 75 | 2 | 112.5 | 112.5 | 18.75 |
| 12 | 84.38 | 3 | 112.5 | 225 | 14.063 |
| 14 | 93.75 | 3 | 125 | 250 | 15.625 |
| 12 | 93.75 | 3 | 62.5 | 125 | 15.625 |
| 16 | 56.25 | 3 | 93.75 | 187.5 | 9.375 |
| 16 | 56.25 | 5 | 78.75 | 315 | 5.625 |

It should be appreciated that a number of engineering difficulties accompany wide-towing sources. For example, to achieve wide-towing sources geometries, there are several parameters that can be adjusted. The first is the crossline force applied to the source spread to pull it into a wide-tow source geometry. The second is the opposing force, generally dominated by the hydrodynamic forces acting normal to the source towing cables when pulled at an angle through the water. The drag of the source array plays a lesser role. The third aspect is the source lay-back (i.e., essentially how far the source is towed behind the vessel). In general, the source separation gets wider the longer the lay-back.

To increase the width of the source spread, the source-to-source separation cable may be removed, as these cables act contrary to the crossline deflection forces. In some embodiments, a source steering system may enable steering of one or more sources to control the relative source positions.

Source cables are not normally built to be pulled at a significant angle through the water, unlike, for example, streamer lead-in cables. When moving at an angle through the water, the source cables will be exposed to vortex induced vibrations (VIV) that take place when the frequency of the water vortices that are generated behind the cable match the Eigen-frequency of the cable itself, hence triggering a resonance response. As these vibrations may be quite violent, a means of suppressing the vibrations should be considered, both for minimizing cable fatigue and also as a means of minimizing the hydrodynamic cross-flow force. The cross-flow force on a cable exposed to VIV may easily reach two to three times that of a non-vibrating cable. Furthermore, source cables used in wide-tow source geometries may be subject to higher tension than with narrow-tow source geometries. Not only does the static tension increase, but the tension response as a result of wave dynamic loading from sea waves becomes larger when the mean tension is higher. Thus, vessel speed may need to be adjusted to accommodate for sea-state variations.

There are various alternative approaches for applying crossline forces to a source geometry. For example, separation lines may be coupled between the sources and the streamer lead-in lines. As another example, rigid source arrays may be towed at an angle relative to the sail line, generating a crossline force. As another example, deflectors may be utilized on the source arrays. The deflectors may generate a crossline force, bringing the source out laterally. As the deflectors are also used as part of a closed-loop control system, some steering capacity may be reserved for the control system, rather than all of the capacity utilized for positioning the source at a desired nominal crossline position. Notably, a deflector system applied to a source spread on a survey vessel must be able to go to zero force so that, during the deployment and recovery phase, the source spread may be able to pass through an opening of the streamer lead-in lines.

Source lay-back is an important parameter for wide-tow source geometries. In general, as the source separation gets wider, the source spread will be towed with a longer lay-back. Normally, for a given crossline force, the source separation increases with lay-back until it reaches a maximum, beyond which the source separation starts to decrease again. The available source cable length can sometimes be a limitation in achieving longer lay-back and/or wider source geometry. Another limiting factor is the buoyancy of the source spread, since the source cables are normally quite heavy. Deploying too much source cable may cause the source spread to sink below the desired actuation depth. Additionally, the survey plan must coordinate the source lay-back with the source-receiver offset. For example, the survey plan may include a nearest offset of as close to 0 m as possible. The source spread would then be towed very close to the front of the streamers, matching the lay-back of the source spread with the lead-ins of the streamers. To facilitate wide-tow source geometry, the matched lay-back would also at the same time be as long as possible. To achieve this, robust and well validated survey simulation tools would be utilized to generate input data for the survey navigation.

Figure 8A:
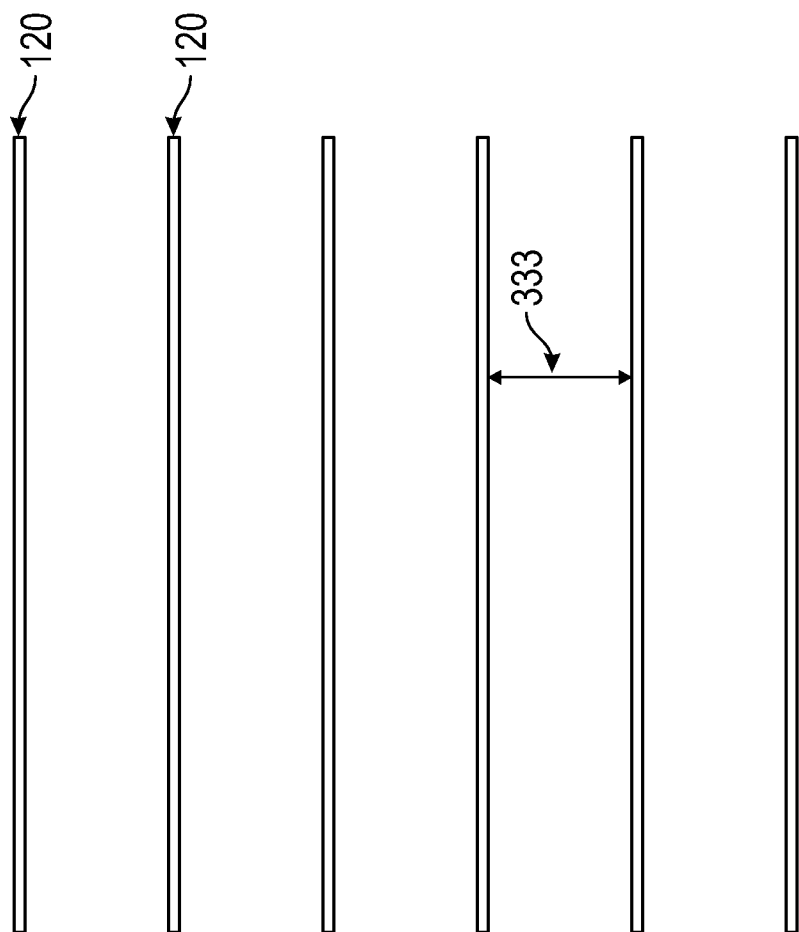
FIG. 8A illustrates an exemplary quad-source, narrow-tow source geometry with a regular streamer spread.

FIG. 8A illustrates an exemplary quad-source, narrow-tow source geometry with a regular streamer spread. The illustrated configuration has six streamers 120 equally spaced, having a streamer separation 333 of about 100 m. The illustrated quad-source, narrow-tow source geometry has four sources 126 that are uniformly spaced, having a source separation of about 25 m.

Figure 8B:
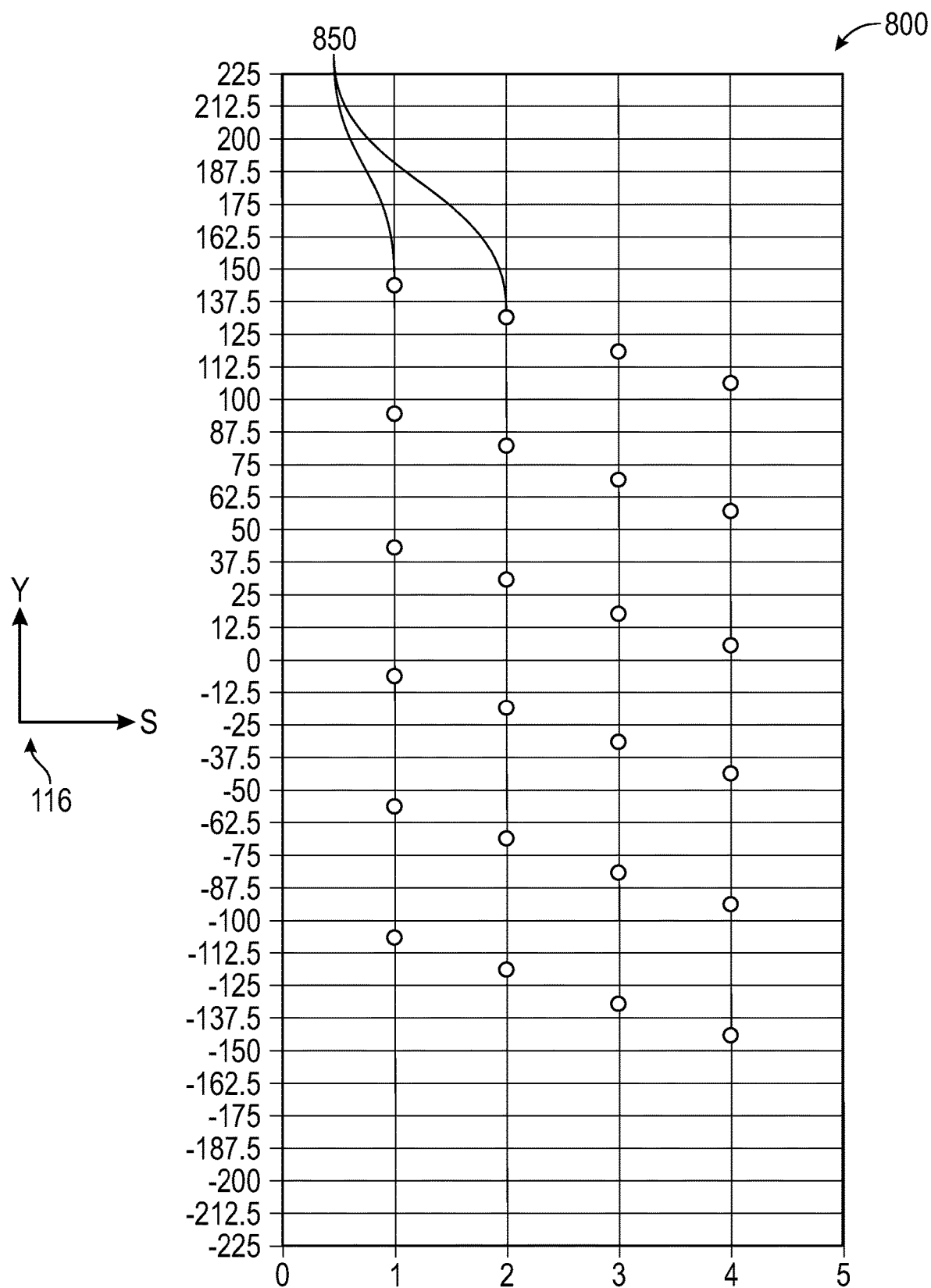
FIG. 8B illustrates a graph of forward-most CMP positions for the survey configuration of FIG. 8A.

FIG. 8B illustrates a graph 800 of forward-most CMP positions 850 for the survey configuration of FIG. 8A. As in FIGS. 6B and 7B, a forward-most CMP position indicates the crossline positional value of a CMP subline. The y-coordinate of ys-plane 116 is the y-axis of the previously-discussed Cartesian coordinate system. Thus, the top of the graph 800 represents the starboard side of the survey configuration, while the bottom of the graph 800 represents the port side of the survey configuration. The s-coordinate of graph 800 identifies a source of the survey configuration. Each forward-most CMP position 850 on a particular vertical axis N is associated with source N, where N=1, 2, 3, 4. The natural crossline bin size for this survey configuration is 12.5 m. Thus, graph 800 illustrates that the CMP data distribution is uniform. Graph 800 also illustrates that there is one forward-most CMP position 850 per crossline bin. In other words, for a particular y-coordinate, only one of the four sources is related to the associated CMP subline.

Figure 9A:
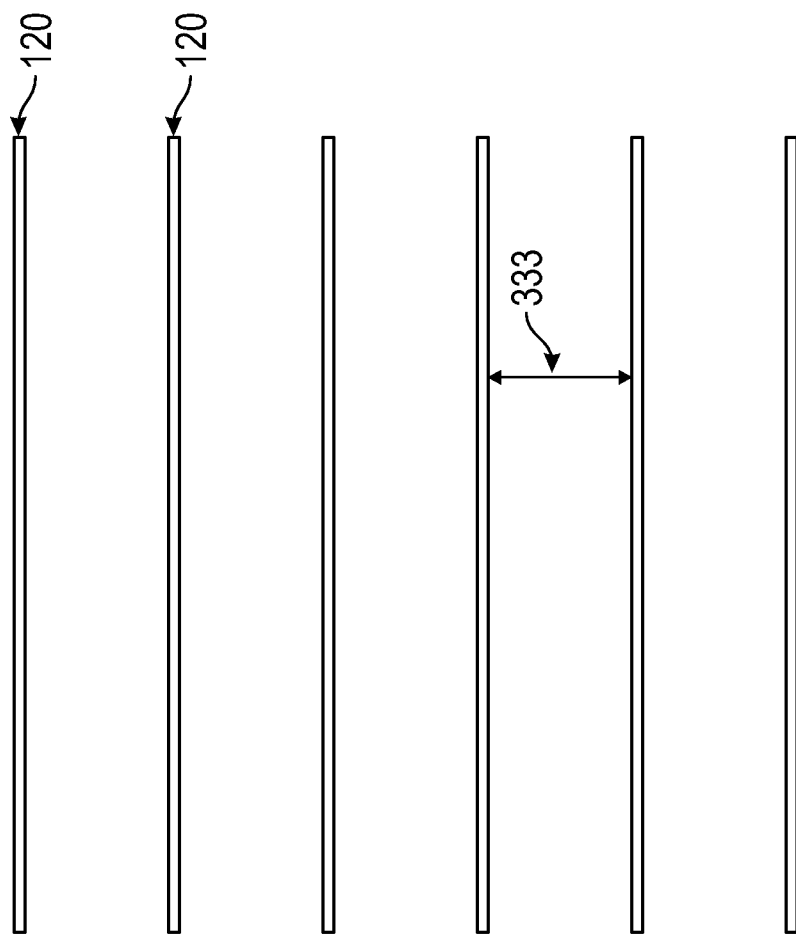
FIG. 9A illustrates an exemplary quad-source, wide-tow source geometry with a regular streamer spread.

FIG. 9A illustrates an exemplary quad-source, wide-tow source geometry with a regular streamer spread. As in FIG. 8A, the illustrated configuration has six streamers 120 equally spaced, having a streamer separation 333 of about 100 m. The illustrated quad-source, wide-tow source geometry has four sources 126 that are uniformly spaced, having a source separation 231 of about 50 m.

Figure 9B:
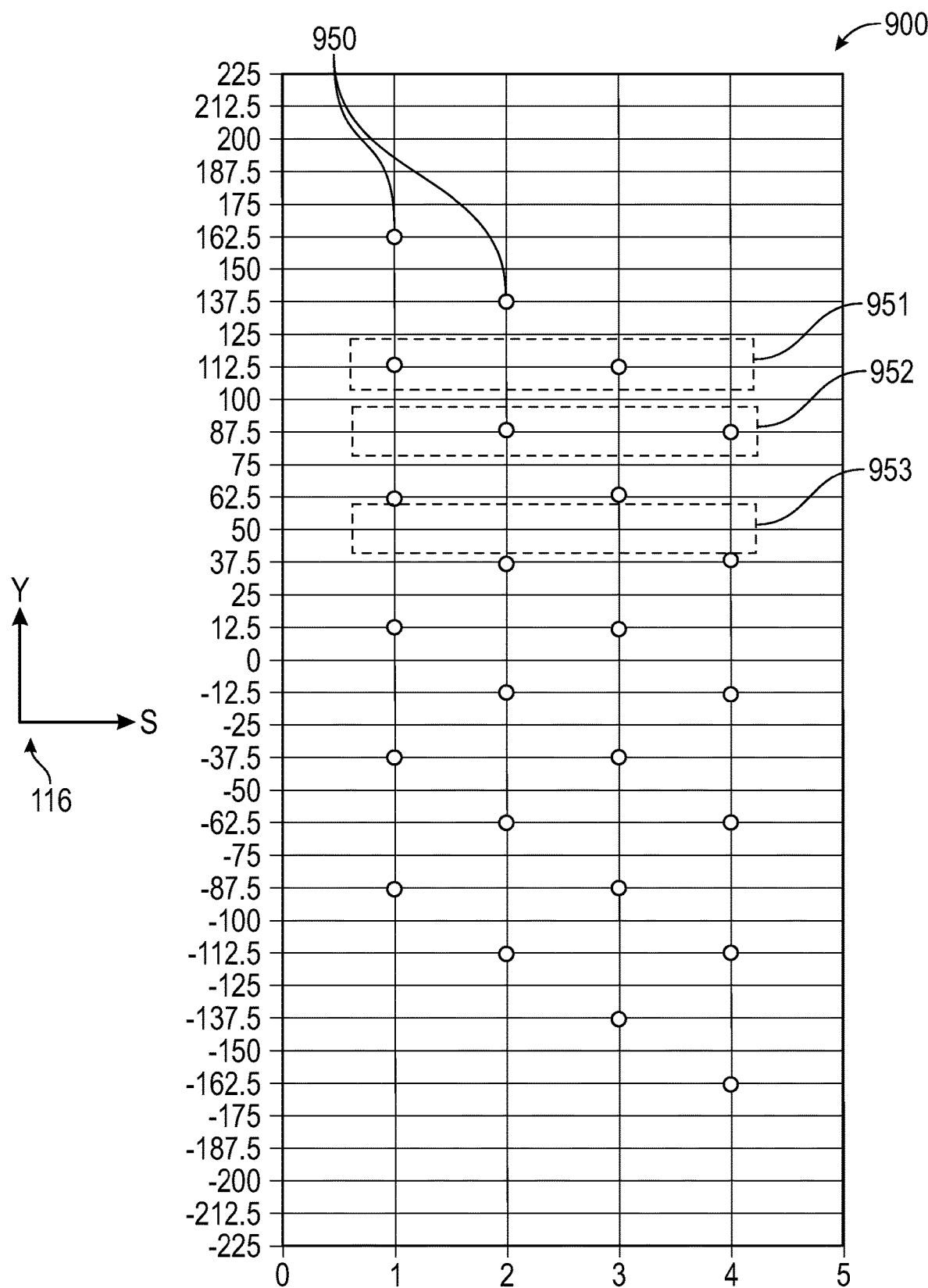
FIG. 9B illustrates a graph of forward-most CMP positions for the survey configuration of FIG. 9A.

FIG. 9B illustrates a graph 900 of forward-most CMP positions 950 for the survey configuration of FIG. 9A. As before, graph 900 is in the ys-plane 116, and each forward-most CMP position 950 on a particular vertical axis N is associated with source N, where N=1, 2, 3, 4. The natural crossline bin size for this survey configuration is 12.5 m. Graph 900 illustrates that the CMP data distribution is not uniform. For example, graph 900 illustrates that there are two forward-most CMP positions 950 per crossline bin. In other words, for some y-coordinates (such as area 951), both sources 1 and 3 are related to the associated CMP subline, while for other y-coordinates (such as area 952), both sources 2 and 4 are related to the associated CMP subline. Graph 900 also illustrates that the CMP data distribution is not uniform in that some CMP sublines are empty (such as the subline of area 953). Thus, the survey configuration of FIG. 9A does not uniformly populate a regular sampling grid.

Figure 10A:
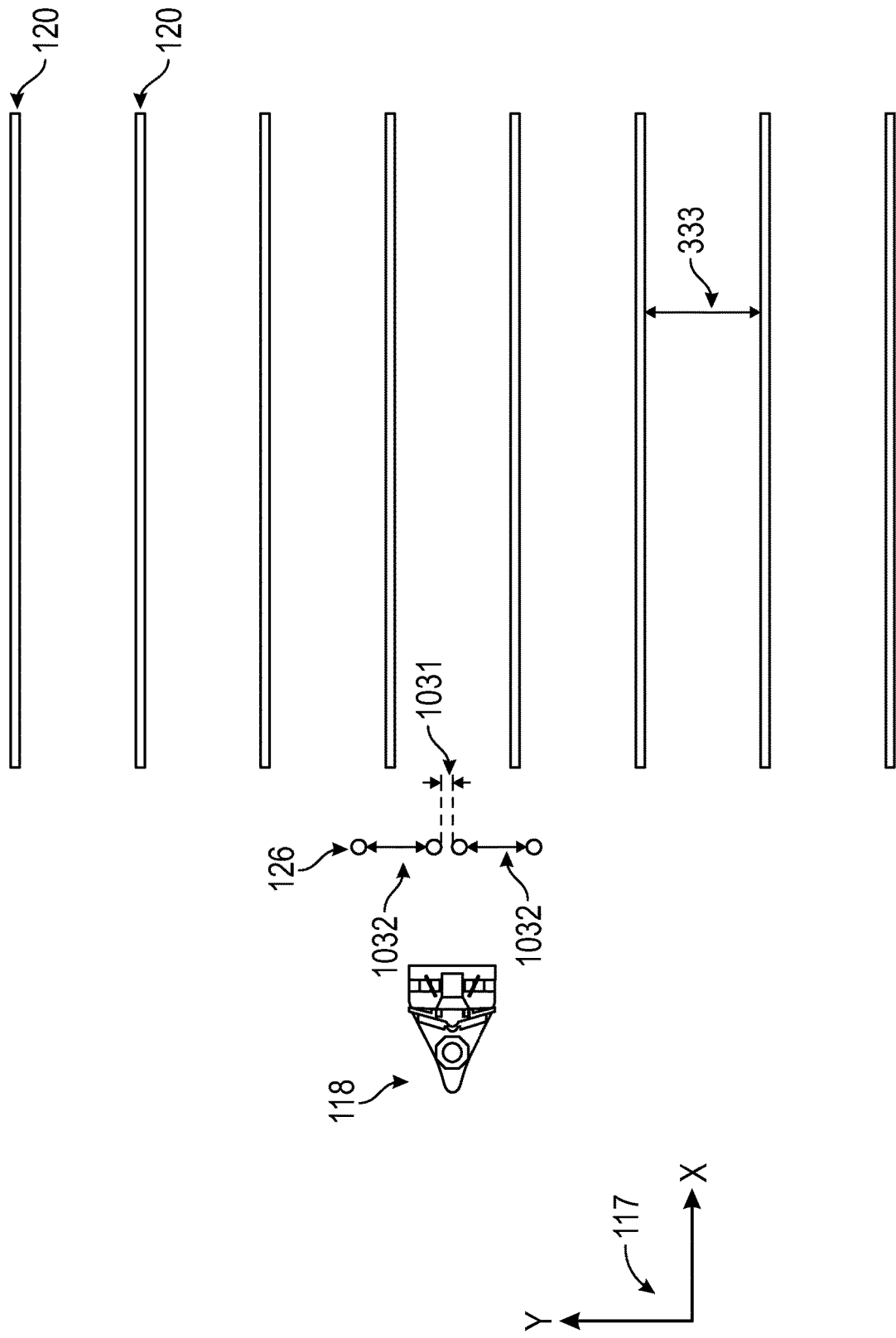
FIG. 10A illustrates an exemplary non-uniform survey configuration with wide-tow source geometry with a regular streamer spread.

FIG. 10A illustrates an exemplary non-uniform survey configuration with wide-tow source geometry with a regular streamer spread. As in FIGS. 8A and 9A, the illustrated configuration has eight streamers 120 equally spaced, having a streamer separation 333 of about 100 m. The illustrated quad-source, non-uniform, wide-tow source geometry has four sources 126 that are non-uniformly spaced, having an innermost source separation 1031 (between the two innermost sources) of about 25 m and an outer source separation 1032 (between each outer sources and the respective nearest innermost source) of about 50 m.

Figure 10B:
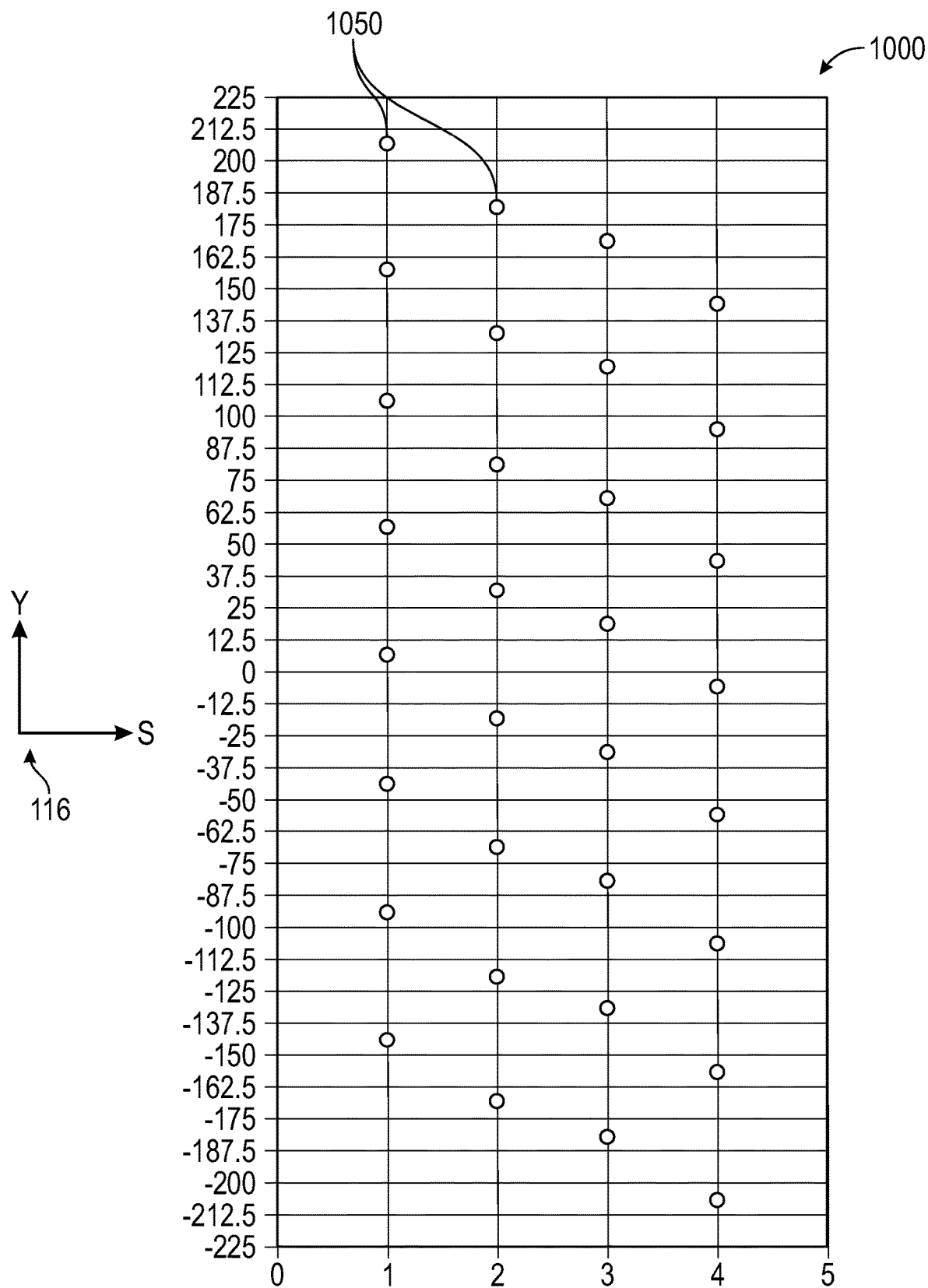
FIG. 10B illustrates a graph of forward-most CMP positions for the survey configuration of FIG. 10A.

FIG. 10B illustrates a graph 1000 of forward-most CMP positions 1050 for the survey configuration of FIG. 10A. As before, graph 1000 is in the ys-plane 116, and each forward-most CMP position 1050 on a particular vertical axis N is associated with source N, where N=1, 2, 3, 4. The natural crossline bin size for this survey configuration is 12.5 m. Thus, graph 1000 illustrates that the CMP data distribution is uniform. Graph 1000 also illustrates that there is one forward-most CMP position 1050 per crossline bin. In other words, for a particular y-coordinate, only one of the four sources is related to the associated CMP subline.

Table 2 shows the nominal nearest offset from an outer source to an outer streamer (port-most source to port-most streamer, and starboard equivalents) for the survey configurations of graphs 800, 900, 1000.

TABLE 2

| Survey Configuration | Outer-Streamer Nearest Offset |
|---|---|
| Graph 800: (uniform) quad-source, narrow-tow source geometry, 25 m source separations | 212.5 m |
| Graph 900: (uniform) quad-source, wide-tow source geometry, 50 m source separations | 175 m |
| Graph 1000: quad-source, non-uniform, wide-tow source geometry, 25 m (innermost) and 50 m (outer) source separations | 187.5 m |

The non-uniform survey configuration with wide-tow source geometry (graph 1000) reduces the nominal nearest offset to the outer streamer compared to the narrow-tow source geometry with 25 m source separations (graph 800). This reduction in offset is a reason why the sources are desired to be towed wider.

Figure 11A:
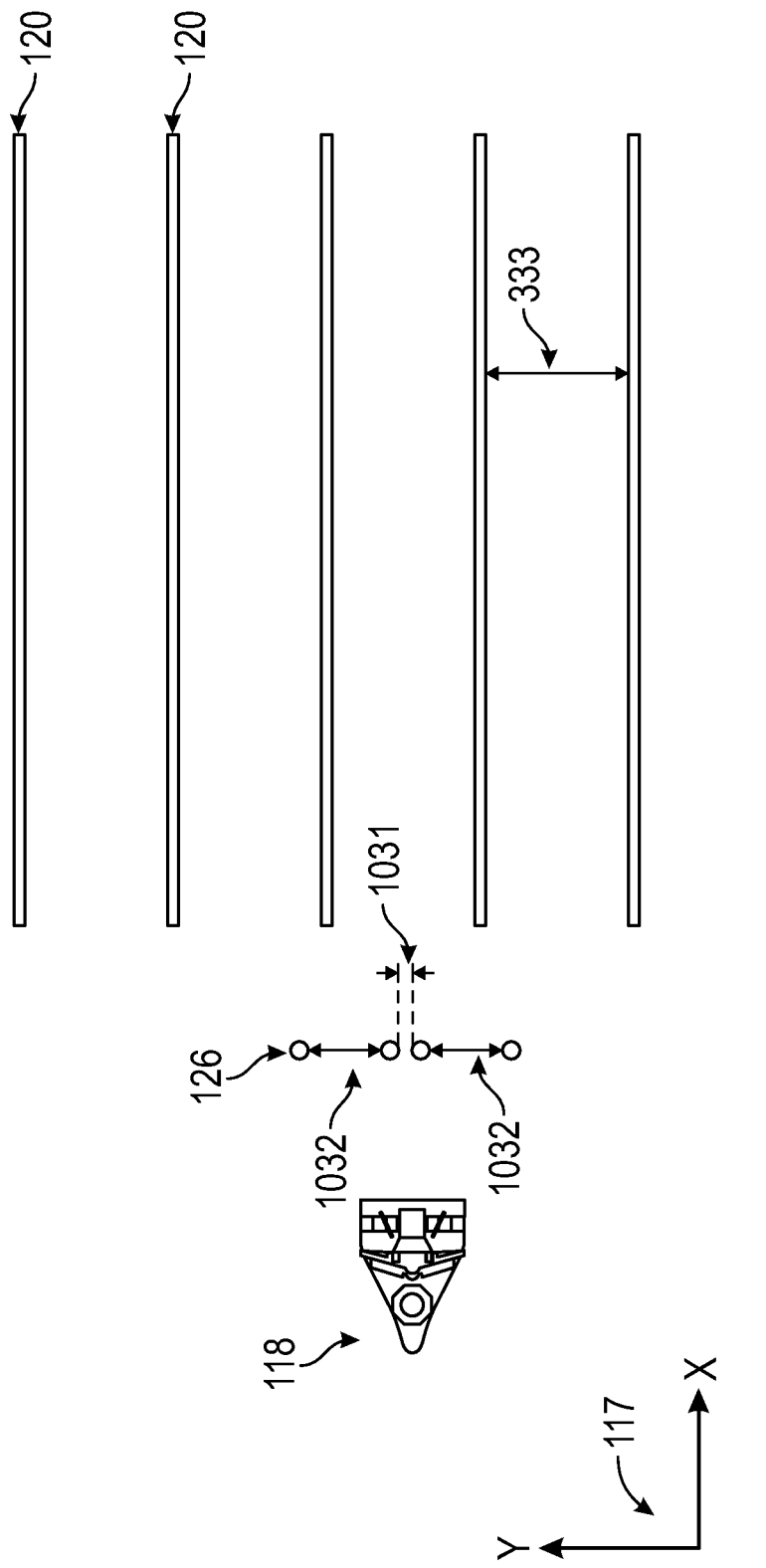
FIG. 11A illustrates another exemplary non-uniform survey configuration with wide-tow source geometry with a regular streamer spread.

FIG. 11A illustrates another exemplary non-uniform survey configuration with wide-tow source geometry with a regular streamer spread. The illustrated configuration has six streamers 120 equally spaced, having a streamer separation 333 of about 100 m. The illustrated quad-source, wide-tow source geometry has four sources 126 that are non-uniformly spaced, having an innermost source separation 1031 of about 25 m and an outer source separation 1032 of about 50 m.

Figure 11B:
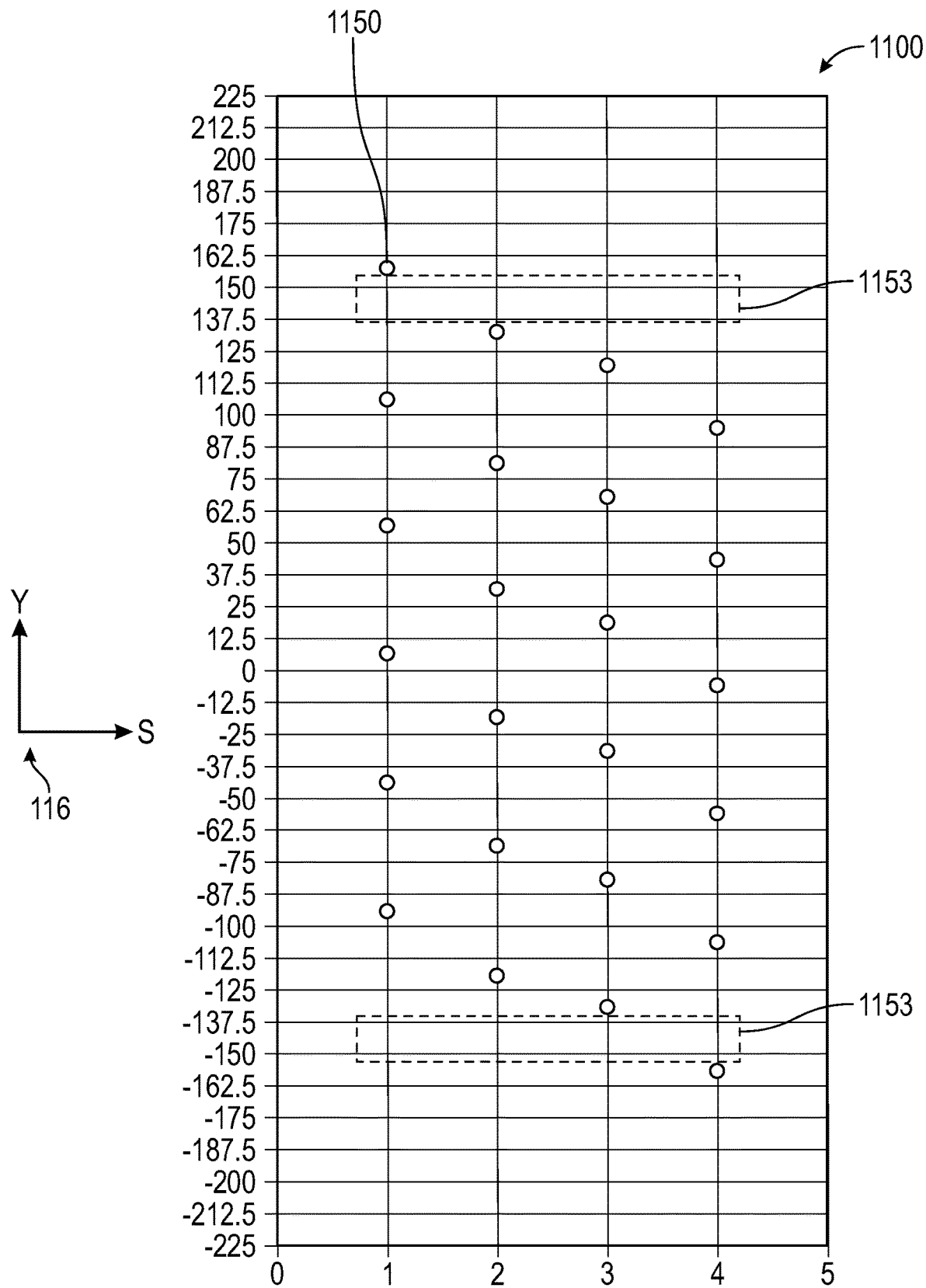
FIG. 11B illustrates a graph of forward-most CMP positions for the survey configuration of FIG. 11A.

FIG. 11B illustrates a graph 1100 of forward-most CMP positions 1150 for the survey configuration of FIG. 11A. As before, graph 1100 is in the ys-plane 116, and each forward-most CMP position 1150 on a particular vertical axis N is associated with source N, where N=1, 2, 3, 4. The natural crossline bin size for this survey configuration is 12.5 m. Note the empty CMP sublines at areas 1153 in graph 1100.

Graph 1100 illustrates that the CMP data distribution is uniform in each of the sublines aside from those at areas 1153. Aside from areas 1153, the survey configuration of FIG. 11A provides a regular sampling grid.

As discussed with reference to FIG. 7B, the sail-line separation may cause CMP sublines from a given acquisition path to be interleaved with CMP sublines of an adjacent acquisition path. In particular, the survey configuration of FIG. 11A may be utilized with a sail-line separation that interleaves CMP sublines of adjacent acquisition paths to provide a regular sampling grid across the survey area, including areas 1153.

Figure 12A:
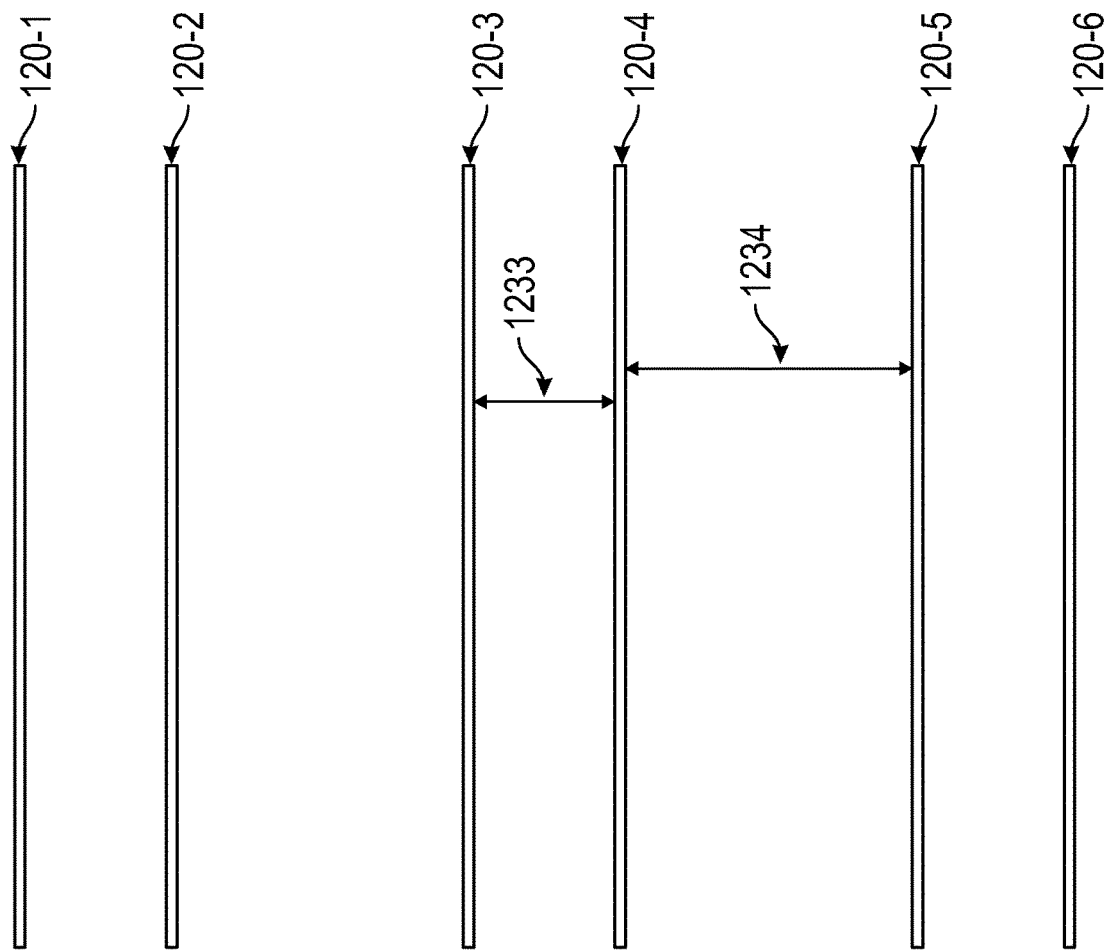
FIG. 12A illustrates another exemplary non-uniform survey configuration with wide-tow source geometry.

FIG. 12A illustrates another exemplary non-uniform survey configuration with wide-tow source geometry. In FIG. 12A, the streamer spread is non-uniform. The illustrated configuration has six streamers 120 that are non-uniformly spaced. The illustrated quad-source, wide-tow source geometry has four sources 126 that are uniformly spaced, having a source separation 231 of about 50 m. As illustrated, each of the following streamer pairs has a reduced streamer separation 1233 of about 75 m: streamers 120-1 and 120-2 (i.e., the starboard-most streamer pair), streamers 120-3 and 120-4 (i.e., the innermost streamer pair), and streamers 120-5 and 120-6 (i.e., the port-most streamer pair). Also as illustrated, each of the following streamer pairs has an expanded streamer separation 1234 of about 125 m: streamers 120-2 and 120-3, streamers 120-4 and 120-5.

Figure 12B:
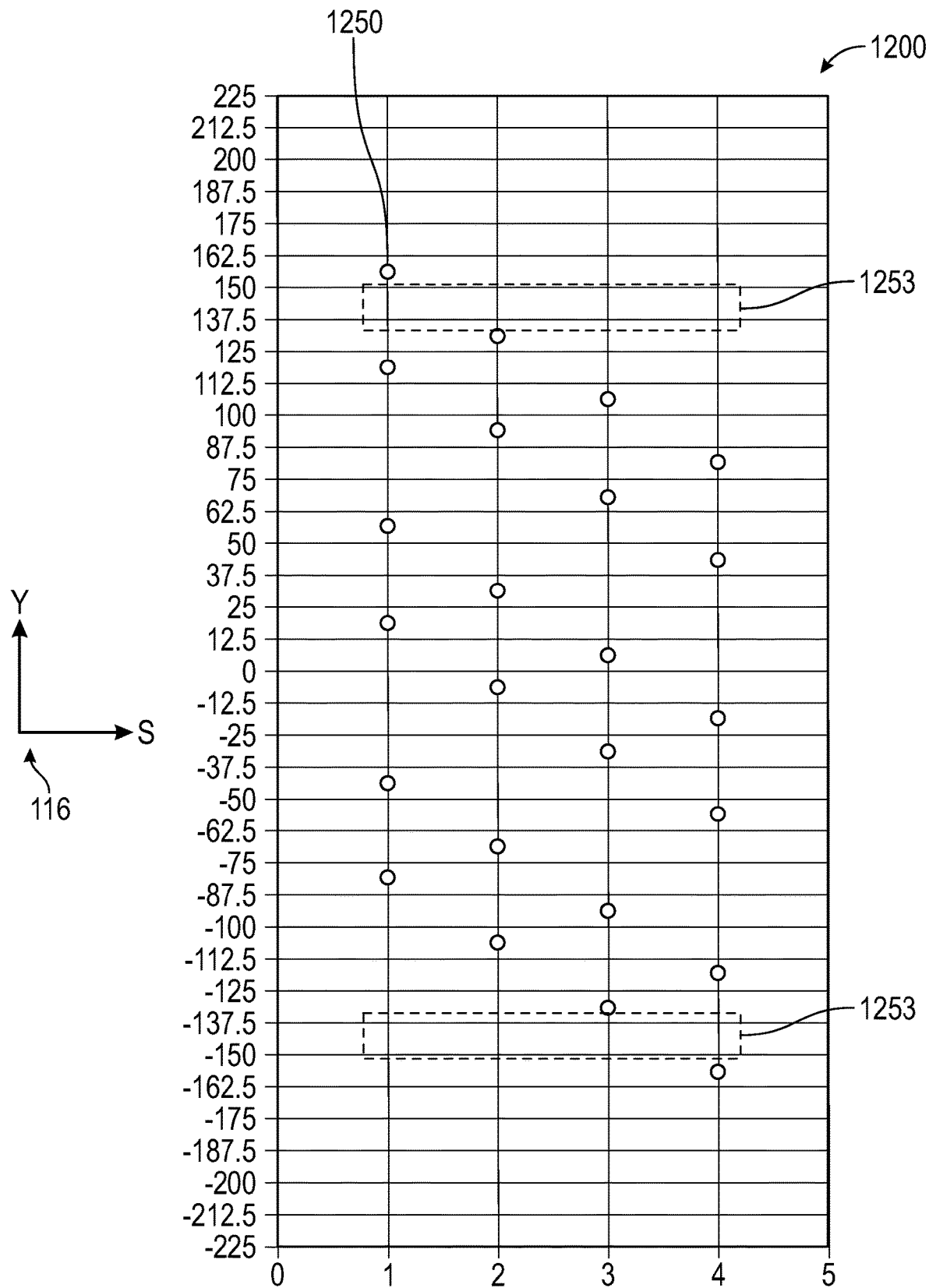
FIG. 12B illustrates a graph of forward-most CMP positions for the survey configuration of FIG. 12A.

FIG. 12B illustrates a graph 1200 of forward-most CMP positions 1250 for the survey configuration of FIG. 12A. As before, graph 1200 is in the ys-plane 116, and each forward-most CMP position 1250 on a particular vertical axis N is associated with source N, where N=1, 2, 3, 4. The natural crossline bin size for this survey configuration is 12.5 m. Similar to graph 1100, graph 1200 illustrates that the CMP data distribution is uniform in each of the sublines—aside from those at areas 1253.

Note the empty CMP sublines at areas 1253 in graph 1200. As discussed with reference to FIG. 7B and FIG. 11B, the sail-line separation may cause the CMP sublines from a given acquisition path to be interleaved with CMP sublines of an adjacent acquisition path. In particular, the survey configuration of FIG. 12A may be utilized with selected sail-line separation to provide a regular sampling grid across the survey area, including areas 1253.

It should be appreciated that a number of other non-uniform survey configurations may be utilized to achieve beneficial results. For example, an octo-source setup may include eight sources. The innermost source separation between adjacent pairs of the six inner sources may be about 25 m. The outer source separation between each of the outer-most sources and the nearest respective inner source may be about 50 m. The source spread width would then be about 225 m, allowing for a uniform streamer separation of about 200 m.

Table 3 illustrates a variety of non-uniform survey configuration with wide-tow source geometry. Some embodiments may include non-uniform source separations. Some embodiments may include non-uniform streamer separations. Some embodiments may include both non-uniform source separations and non-uniform streamer separations. Some embodiments may include source separations which are asymmetric with respect to midline of the survey vessel. Some embodiments may include streamer separations which are asymmetric with respect to the midline of the survey vessel.

TABLE 3

| N sources | N source seps | source seps (port-to-starboard) | N streamers | N streamer seps | streamer seps (port-to-starboard) |
|---|---|---|---|---|---|
| 4 | 3 | 50 m, 25 m, 50 m | 8 | 7 | 100 m each |
| 4 | 3 | 50 m, 25 m, 50 m | 6 | 5 | 100 m each |
| 4 | 3 | 50 m each | 6 | 5 | 75 m, 125 m, 75 m, 125 m, 75 m |
| 4 | 3 | 75 m, 50 m, 25 m | 6 | 5 | 100 m each |
| 4 | 3 | 125 m, 50 m, 75 m | 6 | 5 | 100 m each |
| 8 | 7 | 50 m, 25 m, 25 m, 25 m, 25 m, 25 m, 50 m | 6 | 5 | 200 m each |
| 8 | 7 | 25 m, 12.5 m, 12.5 m, 12.5 m, 12.5 m, 12.5 m, 25 m | 6 | 5 | 100 m each |

It should be appreciated that a number of other non-uniform survey configurations may be utilized to achieve beneficial results addressing particular operational circumstances.

In some embodiments, non-uniform survey configurations with wide-tow source geometries may be utilized to tow sources wider than the smallest streamer separation in order to increase survey efficiency and/or data quality. In some embodiments, non-uniform survey configurations with wide-tow source geometries may solve concerns about CMP sublines repeated for different sources. In some embodiments, a non-uniform survey configuration with wide-tow source geometry may utilize an innermost source separation that is approximately half the separation between an outer source and a nearest innermost source. In some embodiments, non-uniform survey configurations with wide-tow source geometries may be utilized with any streamer separation.

Figure 13:
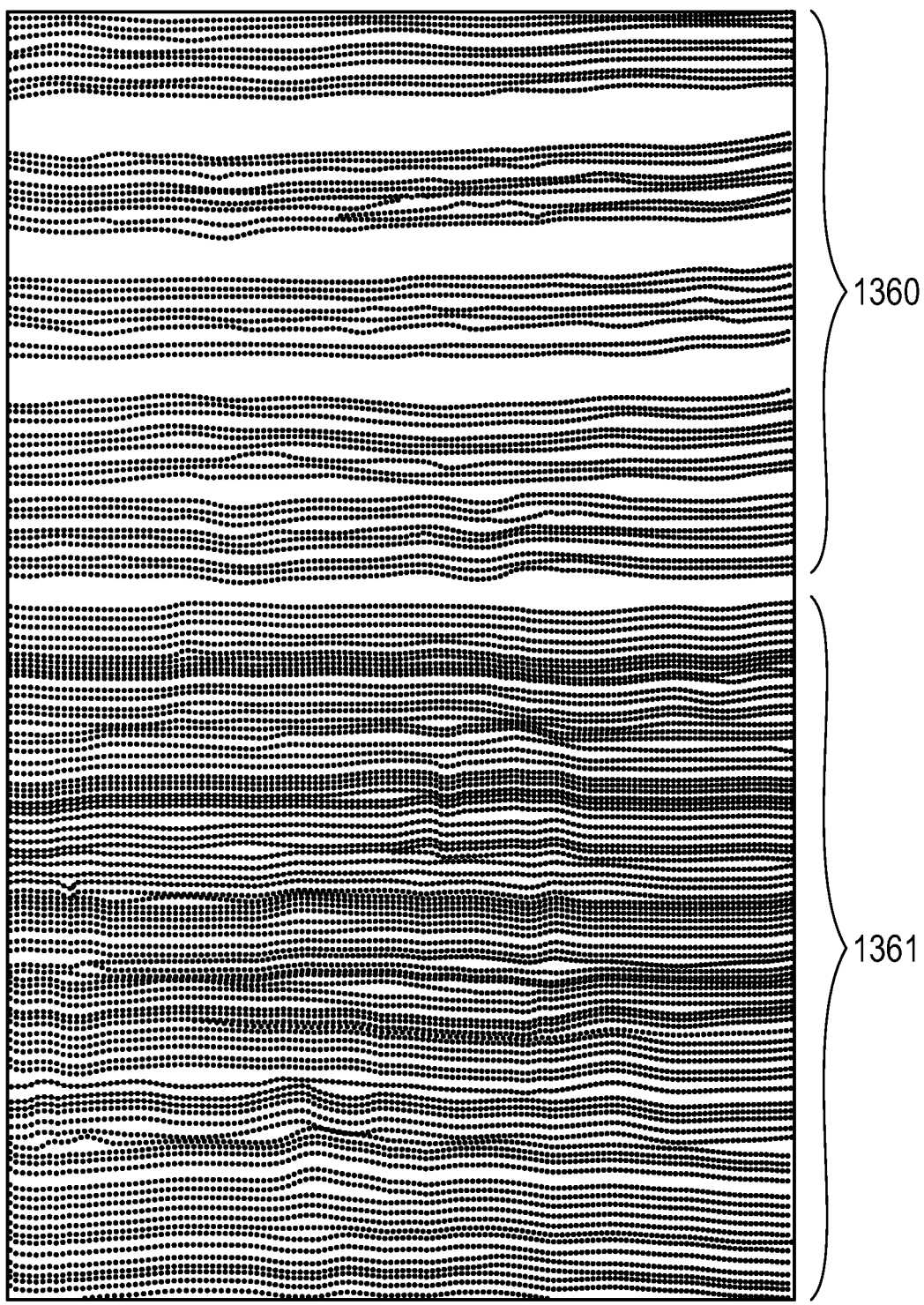
FIG. 13 illustrates ultra-near offset data distributions achieved with wide-tow source geometries.

FIG. 13 illustrates ultra-near offset (e.g., 0 m to about 100 m) data distributions achieved with wide-tow source geometries. The data labeled 1360 was acquired with a wide-tow triple-source geometry. The data labeled 1361 was acquired with a wide-tow penta-source geometries. The penta-source geometry demonstrates excellent data distribution which is free of gaps between sail lines, while keeping the same acquisition efficiency.

Figure 14:
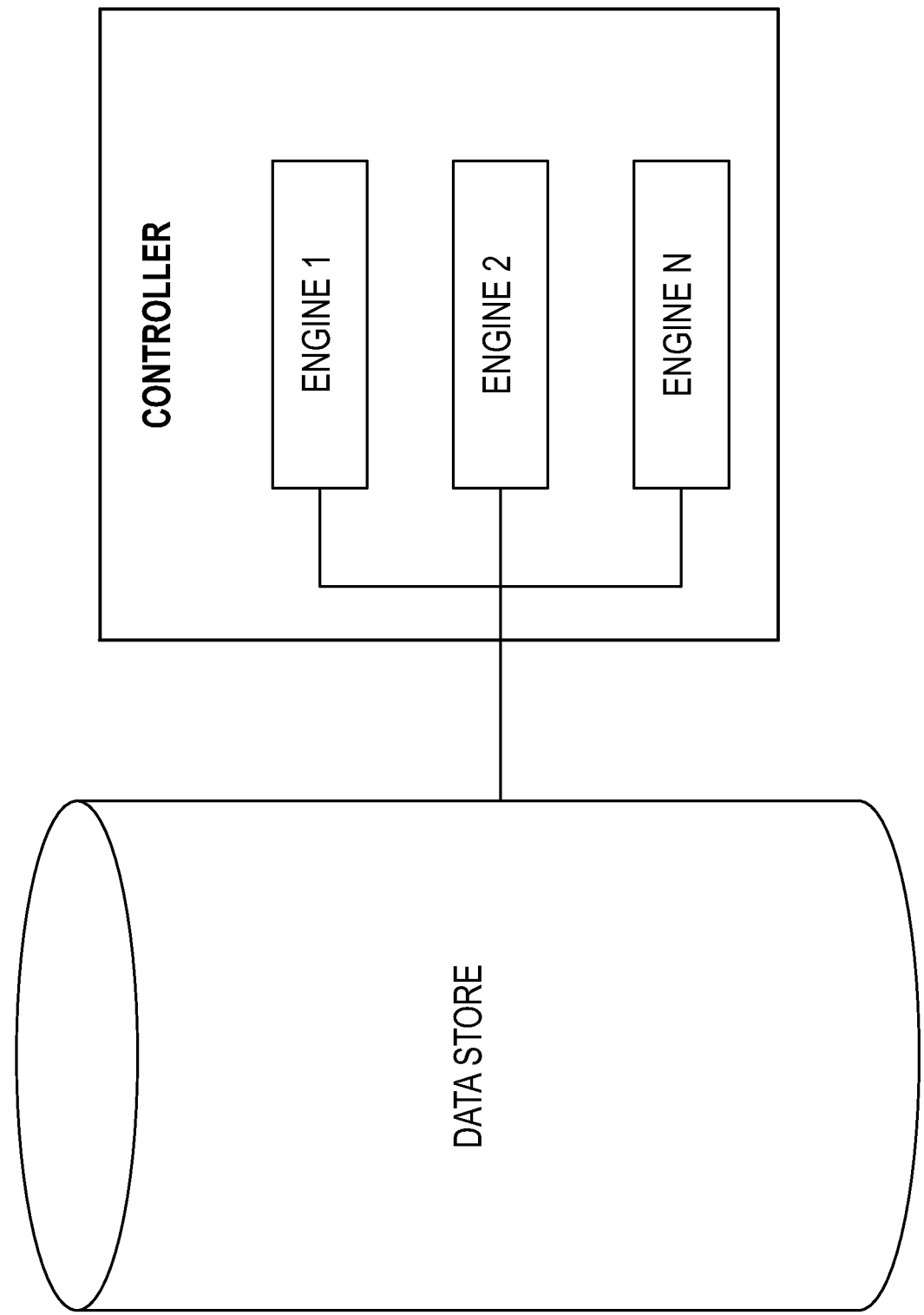
FIG. 14 illustrates an exemplary system for a surveying method with non-a uniform survey configuration with wide-tow source geometry.

FIG. 14 illustrates an exemplary system for a surveying method with a non-uniform survey configuration with wide-tow source geometry. The system can include a data store and a controller coupled to the data store. The controller can be analogous to the controller described with respect to FIGS. 1A-1B. The data store can store marine seismic survey data.

The controller can include a number of engines (e.g., engine 1, engine 2, . . . engine N) and can be in communication with the data store via a communication link. The system can include additional or fewer engines than illustrated to perform the various functions described herein. As used herein, an "engine" can include program instructions and/or hardware, but at least includes hardware. Hardware is a physical component of a machine that enables it to perform a function. Examples of hardware can include a processing resource, a memory resource, a logic gate, an application specific integrated circuit, etc.

The number of engines can include a combination of hardware and program instructions that is configured to perform a number of functions described herein. The program instructions, such as software, firmware, etc., can be stored in a memory resource such as a machine-readable medium or as a hard-wired program such as logic. Hard-wired program instructions can be considered as both program instructions and hardware.

The controller can be configured, for example, via a combination of hardware and program instructions in the number of engines for an acquisition method with non-uniform survey configuration with wide-tow source geometry. For example, a first engine (e.g., engine 1) can be configured to actuate sources, process data, and/or acquire data gathered during acquisition using a non-uniform survey configuration with wide-tow source geometry and method.

Figure 15:
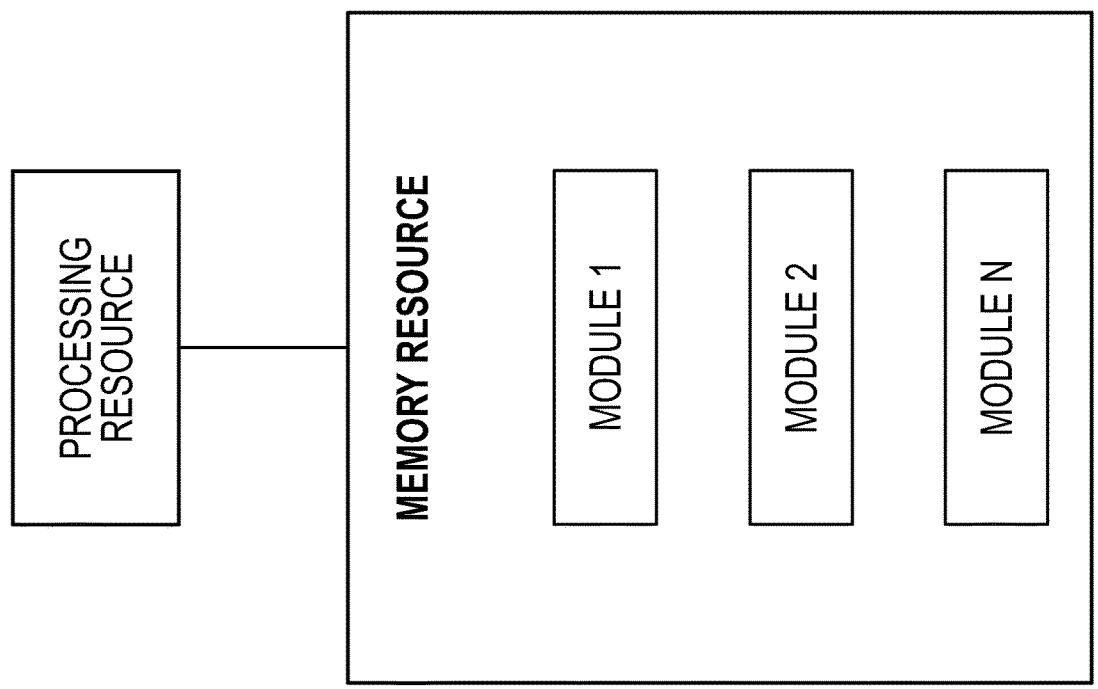
FIG. 15 illustrates an exemplary machine for a surveying method with a non-uniform survey configuration with wide-tow source geometry.

FIG. 15 illustrates an exemplary machine for a surveying method with a non-uniform survey configuration with wide-tow source geometry. In at least one embodiment, the machine can be analogous to the system illustrated in FIG. 14. The machine can utilize software, hardware, firmware, and/or logic to perform a number of functions. The machine can be a combination of hardware and program instructions configured to perform a number of functions (e.g., actions). The hardware, for example, can include a number of processing resources and a number of memory resources, such as a machine-readable medium or other non-transitory memory resources. The memory resources can be internal and/or external to the machine, for example, the machine can include internal memory resources and have access to external memory resources. The program instructions, such as machine-readable instructions, can include instructions stored on the machine-readable medium to implement a particular function. The set of machine-readable instructions can be executable by one or more of the processing resources. The memory resources can be coupled to the machine in a wired and/or wireless manner. For example, the memory resources can be an internal memory, a portable memory, a portable disk, and/or a memory associated with another resource, for example, enabling machine-readable instructions to be transferred and/or executed across a network such as the Internet. As used herein, a "module" can include program instructions and/or hardware, but at least includes program instructions.

The memory resources can be non-transitory and can include volatile and/or non-volatile memory. Volatile memory can include memory that depends upon power to store information, such as various types of dynamic random-access memory among others. Non-volatile memory can include memory that does not depend upon power to store information. Examples of non-volatile memory can include solid state media such as flash memory, electrically erasable programmable read-only memory, phase change random access memory, magnetic memory, optical memory, and/or a solid-state drive, etc., as well as other types of non-transitory machine-readable media.

The processing resources can be coupled to the memory resources via a communication path. The communication path can be local to or remote from the machine. Examples of a local communication path can include an electronic bus internal to a machine, where the memory resources are in communication with the processing resources via the electronic bus. Examples of such electronic buses can include Industry Standard Architecture, Peripheral Component Interconnect, Advanced Technology Attachment, Small Computer System Interface, Universal Serial Bus, among other types of electronic buses and variants thereof. The communication path can be such that the memory resources are remote from the processing resources, such as in a network connection between the memory resources and the processing resources. That is, the communication path can be a network connection. Examples of such a network connection can include a local area network, wide area network, personal area network, and the Internet, among others.

Although not specifically illustrated in FIG. 15, the memory resources can store marine seismic survey data. As is shown in FIG. 15, the machine-readable instructions stored in the memory resources can be segmented into a number of modules (e.g., module 1, module 2, . . . module N) that when executed by the processing resources can perform a number of functions. As used herein a module includes a set of instructions included to perform a particular task or action. The number of modules can be sub-modules of other modules. For example, module 1 can be a sub-module of module 2. Furthermore, the number of modules can comprise individual modules separate and distinct from one another. Examples are not limited to the specific modules illustrated in FIG. 15.

In at least one embodiment of the present disclosure, a first module (e.g., module 1) can include program instructions and/or a combination of hardware and program instructions that, when executed by a processing resource, can actuate sources, process data, and/or acquire data gathered during acquisition using a non-uniform surveying configuration with wide-tow source geometry and/or method of surveying therewith.

In accordance with a number of embodiments of the present disclosure, a geophysical data product may be manufactured. The geophysical data product may be indicative of certain properties of a subterranean formation. The geophysical data product may include and/or be manufactured with, for example, survey data, seismic data, electromagnetic data, pressure data, particle motion data, particle velocity data, particle acceleration data, CMP subline data, data acquired with a non-uniform configuration with wide-tow source geometry, and any seismic image that results from using the methods and systems described above. The geophysical data product may be stored on a tangible and/or non-transitory computer-readable media. The geophysical data product may be produced by processing geophysical data offshore (i.e. by equipment on a vessel) or onshore (i.e. at a facility on land) either within the United States or in another country. If the geophysical data product is produced offshore or in another country, it may be imported onshore to a facility in the United States. For example, the geophysical data product may be transmitted onshore, and/or the tangible and/or non-transitory computer-readable media may be brought onshore. In some instances, once onshore in the United States, geophysical analysis, including further data processing, may be performed on the geophysical data product. In some instances, geophysical analysis may be performed on the geophysical data product offshore.

In an embodiment, a marine surveying system includes a survey plan comprising a plurality of sail lines for a survey area; a plurality of sources in a wide-tow source geometry, the wide-tow source geometry comprising a plurality of source separations; and a plurality of streamers comprising a plurality of receivers, the plurality of streamers having a plurality of streamer separations, wherein: at least one of the plurality of source separations or the plurality of streamer separations is non-uniform, and the plurality of sail lines, the plurality of sources, and plurality of receivers provide uniform CMP coverage for the survey area.

In one or more embodiments disclosed herein, the survey plan includes interleaved CMP sublines.

In one or more embodiments disclosed herein, the plurality of sources comprises at least four sources.

In one or more embodiments disclosed herein, the plurality of streamers comprises at least six streamers.

In one or more embodiments disclosed herein, the plurality of streamers has a uniform streamer separation.

In one or more embodiments disclosed herein, the uniform streamer separation is about 100 m.

In one or more embodiments disclosed herein, the plurality of sources has a uniform source separation, and the plurality of streamer separations comprises a smaller streamer separation and a larger streamer separation.

In one or more embodiments disclosed herein, the plurality of streamer separations alternate from port to starboard between the smaller streamer separation and the larger streamer separation.

In one or more embodiments disclosed herein, the uniform source separation is about 50 m, the smaller streamer separation is about 75 m, and the larger streamer separation is about 125 m.

In one or more embodiments disclosed herein, the system also includes a survey vessel configured to tow the plurality of sources and the plurality of streamers.

In one or more embodiments disclosed herein, the plurality of sources includes: a plurality of inner sources, wherein each adjacent pair of inner sources has an innermost source separation; and two outer sources, wherein: each outer source is separated from a nearest inner source of the plurality of inner sources by an outer source separation, and the innermost source separation is smaller than the outer source separation.

In one or more embodiments disclosed herein, the innermost source separation is nominally about half of the outer source separation.

In one or more embodiments disclosed herein, the innermost source separation is nominally about 25 m, and the outer source separation is nominally about 50 m.

In one or more embodiments disclosed herein, the plurality of inner sources comprises two inner sources.

In an embodiment, a method includes: operating a marine surveying system along a sail line in a survey area by: towing a plurality of sources in a wide-tow source geometry, the wide-tow source geometry comprising a plurality of source separations; towing a plurality of streamers that comprise a plurality of receivers, the plurality of streamers having a plurality of streamer separations; actuating at least one of the plurality of sources to create a signal; and detecting the signal with a first receiver of the plurality of receivers, wherein: at least one of the plurality of source separations or the plurality of streamer separations is non-uniform, and the plurality of sources and the plurality of receivers provide a regular sampling grid for the survey area.

In one or more embodiments disclosed herein, the sail line is included in a plurality of sail lines in the survey area, and the method also includes acquiring CMP subline data along each sail line of the plurality of sail lines, wherein: a first sail line of the plurality of sail lines is adjacent to a second sail line of the plurality of sail lines; and CMP subline data of the first sail line is interleaved with CMP subline data of the second sail line.

In one or more embodiments disclosed herein, the plurality of sources comprises at least four sources.

In one or more embodiments disclosed herein, the plurality of streamers comprises at least six streamers.

In one or more embodiments disclosed herein, the plurality of streamers has a uniform streamer separation.

In one or more embodiments disclosed herein, the uniform streamer separation is about 100 m.

In one or more embodiments disclosed herein, the plurality of sources has a uniform source separation, and the plurality of streamer separations comprises a smaller streamer separation and a larger streamer separation.

In one or more embodiments disclosed herein, the plurality of streamer separations alternate from port to starboard between the smaller streamer separation and the larger streamer separation.

In one or more embodiments disclosed herein, the uniform source separation is about 50 m, the smaller streamer separation is about 75 m, and the larger streamer separation is about 125 m.

In one or more embodiments disclosed herein, the method also includes towing the plurality of sources and the plurality of streamers with a survey vessel.

In one or more embodiments disclosed herein, the detected signal is indicative of a shallow target.

In one or more embodiments disclosed herein, the plurality of sources includes: a plurality of inner sources, wherein each adjacent pair of inner sources has an innermost source separation; and two outer sources, wherein: each outer source is separated from a nearest inner source of the plurality of inner sources by an outer source separation, and the innermost source separation is smaller than the outer source separation.

In one or more embodiments disclosed herein, the innermost source separation is nominally about half of the outer source separation.

In one or more embodiments disclosed herein, the innermost source separation is nominally about 25 m, and the outer source separation is nominally about 50 m.

In one or more embodiments disclosed herein, the plurality of inner sources comprises two inner sources.

In one or more embodiments disclosed herein, the method also includes manufacturing a geophysical data product related to the detected signal; and storing the geophysical data product on one or more non-transitory, tangible computer-readable media.

In one or more embodiments disclosed herein, the method also includes bringing the computer-readable media onshore; and performing geophysical analysis onshore on the geophysical data product.

In an embodiment, a method of manufacturing a geophysical data product includes: obtaining geophysical data for a subterranean formation; and processing the geophysical data to produce an image of the subterranean formation; wherein obtaining the geophysical data comprises operating a marine surveying system along a sail line in a survey area by: towing a plurality of sources in a wide-tow source geometry, the wide-tow source geometry comprising a plurality of source separations; towing a plurality of streamers that comprise a plurality of receivers, the plurality of streamers having a plurality of streamer separations; actuating at least one of the plurality of sources to create a signal; detecting the signal with a first receiver of the plurality of receivers, wherein: at least one of the plurality of source separations or the plurality of streamer separations is non-uniform, and the plurality of sources and the plurality of receivers provide a regular sampling grid for the survey area; and producing the geophysical data with the detected signal.

In one or more embodiments disclosed herein, the sail line is included in a plurality of sail lines in the survey area, and obtaining the geophysical data further includes acquiring CMP subline data along each sail line of the plurality of sail lines, wherein: a first sail line of the plurality of sail lines is adjacent to a second sail line of the plurality of sail lines; and CMP subline data of the first sail line is interleaved with CMP subline data of the second sail line.

In one or more embodiments disclosed herein, the method also includes recording the image on one or more non-transitory computer-readable media, thereby creating the geophysical data product.

In one or more embodiments disclosed herein, the method also includes performing geophysical analysis onshore on the geophysical data product.

In an embodiment, a method includes: operating a marine surveying system in a survey area, the marine surveying system having a non-uniform configuration with wide-tow source geometry; actuating at least one of a plurality of sources from the marine surveying system to create a signal; and detecting the signal with a first receiver of a plurality of receivers from the marine surveying system.

In one or more embodiments disclosed herein, the method also includes acquiring data for the survey area, the data having uniform CMP coverage.

In one or more embodiments disclosed herein, acquiring data for the survey area comprises acquiring CMP subline data along a first sail line and along a second sail line, wherein: the first sail line is adjacent to the second sail line; and CMP subline data of the first sail line is interleaved with CMP subline data of the second sail line.

In one or more embodiments disclosed herein, the marine surveying system includes: the plurality of sources in a wide-tow source geometry; and a plurality of streamers comprising the plurality of receivers.

In one or more embodiments disclosed herein, the plurality of sources have non-uniform source separations.

In one or more embodiments disclosed herein, the plurality of streamers have non-uniform streamer separations.

In one or more embodiments disclosed herein, the plurality of sources are asymmetrically distributed about a midline of a survey vessel of the marine surveying system.

In one or more embodiments disclosed herein, the method also includes manufacturing a geophysical data product related to the detected signal; and storing the geophysical data product on one or more non-transitory, tangible computer-readable media.

In one or more embodiments disclosed herein, the method also includes bringing the computer-readable media onshore; and performing geophysical analysis onshore on the geophysical data product.

While the foregoing is directed to embodiments of the present disclosure, other and further embodiments of the disclosure may be devised without departing from the basic scope thereof, and the scope thereof is determined by the claims that follow.

The invention claimed is:
1. A method, comprising:
operating a marine surveying system in a survey area, wherein the surveying system comprises a plurality of sources in a wide-tow source geometry having a plurality of source separations, and a plurality of streamers that comprise a plurality of receivers, the plurality of streamers having a plurality of streamer separations, and wherein the plurality of sources and the plurality of streamers are towed by a single vessel such that a crossline distance between outermost ones of the sources is less than a crossline distance between outermost ones of the streamers;
during each of a plurality of sail lines traversed by the surveying system, actuating at least one of the plurality of sources to create a signal and detecting the signal with at least a first receiver of the plurality of receivers, wherein each of the sail lines generates a set of common midpoint ("CMP") sublines, each set exhibiting a non-uniform CMP data distribution; and
reducing the non-uniformity of the CMP data distribution of at least one of the sets of CMP sublines by sailing the surveying system along at least first and second sail lines such that at least one CMP subline corresponding to the first sail line is interleaved between CMP sublines corresponding to the second sail line;
wherein the plurality of sources comprises a plurality of inner sources, wherein each adjacent pair of inner sources has an innermost source separation, and two outer sources, wherein each outer source is separated from a nearest inner source of the plurality of inner sources by an outer source separation, and the innermost source separation is smaller than the outer source separation.

2. The method of claim 1, wherein the plurality of streamers has a uniform streamer separation.

3. The method of claim 1, wherein:
the plurality of streamer separations comprises a smaller streamer separation and a larger streamer separation.

4. The method of claim 1, wherein the detected signal is indicative of a shallow target.

5. The method of claim 1, wherein the innermost source separation is nominally about half of the outer source separation.

6. The method of claim 5, wherein:
the innermost source separation is about 25 m; and
the outer source separation is about 50 m.

7. The method of claim 1, further comprising:
manufacturing a geophysical data product by at least storing geophysical data representing the detected signal on one or more non-transitory, tangible computer-readable media.

8. The method of claim 7, further comprising:
bringing the geophysical data product onshore; and
performing geophysical analysis onshore using the geophysical data product.

9. The method of claim 1, wherein:
the streamer separation is uniform;
the innermost source separation is about one fourth of the streamer separation; and
the outer source separation is about one half of the streamer separation.

10. A marine surveying system, comprising:
a controller;
a memory resource having instructions stored therein that, when executed by the controller, cause the controller to implement a marine survey comprising:
a plurality of sail lines for a survey area;
a plurality of sources in a wide-tow source geometry, the wide-tow source geometry comprising a plurality of source separations; and
a plurality of streamers comprising a plurality of receivers, the plurality of streamers having a plurality of streamer separations;
wherein the plurality of sources and the plurality of streamers are towed by a single vessel such that a crossline distance between outermost ones of the sources is less than a crossline distance between outermost ones of the streamers;
and
wherein the marine survey further comprises:
acquiring common midpoint ("CMP") sublines along at least a first sail line and along at least a second sail line, such that the first sail line is adjacent to the second sail line and at least one CMP subline of the first sail line is interleaved with CMP sublines of the second sail line;
wherein the plurality of sources comprises a plurality of inner sources, wherein each adjacent pair of inner sources has an innermost source separation, and two outer sources, wherein each outer source is separated from a nearest inner source of the plurality of inner sources by an outer source separation, and the innermost source separation is smaller than the outer source separation.

11. The system of claim 10, wherein the innermost source separation is nominally about half of the outer source separation.

12. The system of claim 11, wherein:
the innermost source separation is about 25 m; and
the outer source separation is about 50 m.

13. The system of claim 10, wherein:
the CMP sublines of the first sail line exhibit non-uniform CMP coverage; and
the CMP sublines of the second sail line exhibit non-uniform CMP coverage.

14. The system of claim 10, wherein:
the streamer separation is uniform;
the innermost source separation is about one fourth of the streamer separation; and
the outer source separation is about one half of the streamer separation.

15. A method, comprising:
operating a marine surveying system in a survey area, the marine surveying system comprising a plurality of streamers and a plurality of sources configured in a wide-tow source geometry, wherein the plurality of sources and the plurality of streamers are towed by a single vessel such that a crossline distance between outermost ones of the sources is less than a crossline distance between outermost ones of the streamers; and
acquiring data for the survey area by actuating at least one of the sources to create a signal and detecting the signal with at least a first receiver of a plurality of receivers from the marine surveying system;
wherein acquiring data for the survey area comprises acquiring common midpoint ("CMP") sublines along at least a first sail line and along at least a second sail line, such that the first sail line is adjacent to the second sail line and at least one CMP subline of the first sail line is interleaved with CMP sublines of the second sail line; and
wherein the plurality of sources comprises a plurality of inner sources, wherein each adjacent pair of inner sources has an innermost source separation, and two outer sources, wherein each outer source is separated from a nearest inner source of the plurality of inner sources by an outer source separation, and the innermost source separation is smaller than the outer source separation.

16. The method of claim 15, further comprising:
interleaving CMP sublines from a sufficient number of adjacent sail lines such that a CMP data distribution corresponding to at least the first sail line is made uniform.

17. The method of claim 15, wherein:
the plurality of streamers comprises the plurality of receivers.

18. The method of claim 17, wherein the plurality of streamers have non-uniform streamer separations.

19. The method of claim 17, wherein:
the plurality of sources are asymmetrically distributed about a midline of the vessel.

* * * * *